US011727599B2

(12) United States Patent
Tanaka et al.

(10) Patent No.: US 11,727,599 B2
(45) Date of Patent: Aug. 15, 2023

(54) COLOR CORRESPONDENCE INFORMATION GENERATING SYSTEM, PROGRAM, AND METHOD OF GENERATING COLOR CORRESPONDENCE INFORMATION

(71) Applicant: TOPPAN PRINTING CO., LTD., Tokyo (JP)

(72) Inventors: Takaya Tanaka, Taito-ku (JP); Takashi Inamura, Taito-ku (JP); Kazuhiro Sano, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 219 days.

(21) Appl. No.: 17/028,105

(22) Filed: Sep. 22, 2020

(65) Prior Publication Data
US 2021/0004989 A1    Jan. 7, 2021

Related U.S. Application Data

(63) Continuation of application No. PCT/JP2019/012075, filed on Mar. 22, 2019.

(30) Foreign Application Priority Data

Mar. 22, 2018    (JP) .................................. 2018-055205

(51) Int. Cl.
*G06K 9/00* (2022.01)
*G06T 7/90* (2017.01)
(Continued)

(52) U.S. Cl.
CPC ................ *G06T 7/90* (2017.01); *G06T 5/001* (2013.01); *G06T 7/0002* (2013.01); *G06T 2207/10024* (2013.01); *G06T 2207/30168* (2013.01)

(58) Field of Classification Search
CPC ......... G06T 7/90; G06T 5/001; G06T 7/0002; G06T 2207/10024; G06T 2207/30168
(Continued)

(56) References Cited

U.S. PATENT DOCUMENTS 6,075,563 A  *  6/2000  Hung ..................... H04N 9/735
                                                         238/231
6,549,653 B1    4/2003  Osawa et al.
(Continued)

FOREIGN PATENT DOCUMENTS

JP    2002-027264 A    1/2002
JP    2002-152768 A    5/2002
(Continued)

OTHER PUBLICATIONS

Extended European Search Report dated Nov. 23, 2021 in European Patent Application No. 19772309.1, 15 pages.
(Continued)

*Primary Examiner* — Jonathan S Lee
(74) *Attorney, Agent, or Firm* — Oblon, McClelland, Maier & Neustadt, L.L.P.

(57) ABSTRACT

A color correspondence information generating system includes an object database that stores correspondences between recognition information and color characteristic information about first objects recognized by the recognition information; an object recognition section that recognizes the first objects in the first image from the first image and the recognition information, and outputs image regions of the first objects in the first image and first color characteristic information; and a color correspondence information generation section that generates the color correspondence information using the color information and the first color characteristic information of pixels in the image regions. The color characteristic information and the recognition (Continued)

information have a one-to-one correspondence relation with each other, or the color characteristic information is the recognition information itself.

24 Claims, 13 Drawing Sheets

(51) Int. Cl.
   *G06T 5/00* (2006.01)
   *G06T 7/00* (2017.01)
(58) Field of Classification Search
   USPC .......................................................... 382/165
   See application file for complete search history.

(56) References Cited

U.S. PATENT DOCUMENTS

| | | | | |
|---|---|---|---|---|
| 7,457,003 | B1* | 11/2008 | Marcu | .................. H04N 1/6058 358/1.9 |
| 2003/0185438 | A1 | 10/2003 | Osawa et al. | |
| 2005/0207644 | A1 | 9/2005 | Kitagawara et al. | |
| 2006/0061841 | A1 | 3/2006 | Osawa et al. | |
| 2007/0030506 | A1* | 2/2007 | Takabayashi | ...... H04N 1/00172 358/448 |
| 2012/0008170 | A1* | 1/2012 | Yan | ...................... H04N 1/6033 358/3.06 |
| 2012/0019843 | A1* | 1/2012 | Kishimoto | ........... H04N 1/6058 358/1.9 |
| 2012/0224768 | A1* | 9/2012 | Lee | ..................... G06F 16/5838 382/165 |
| 2015/0172513 | A1 | 6/2015 | Noorkami et al. | |
| 2017/0228611 | A1 | 8/2017 | Shtok et al. | |
| 2018/0278839 | A1* | 9/2018 | Sivan | ................. H04N 5/23229 |
| 2018/0322360 | A1 | 11/2018 | Shtok et al. | |

FOREIGN PATENT DOCUMENTS

| | | |
|---|---|---|
| JP | 2006-254006 A | 9/2006 |
| JP | 2015-133220 A | 7/2015 |
| JP | 2016-010013 A | 1/2016 |

OTHER PUBLICATIONS

International Search Report dated Jun. 18, 2019 in PCT/JP2019/012075, filed Mar. 22, 2019 (with English Translation).

* cited by examiner

| COLOR-CORRECTION-OBJECT IDENTIFICATION INFORMATION | COLOR CHARACTERISTIC INFORMATION | OBJECT RECOGNITION INFORMATION |
|---|---|---|
| ****** | ******** | ********** |
| ****** | ******** | ********** |
| ****** | ******** | ********** |

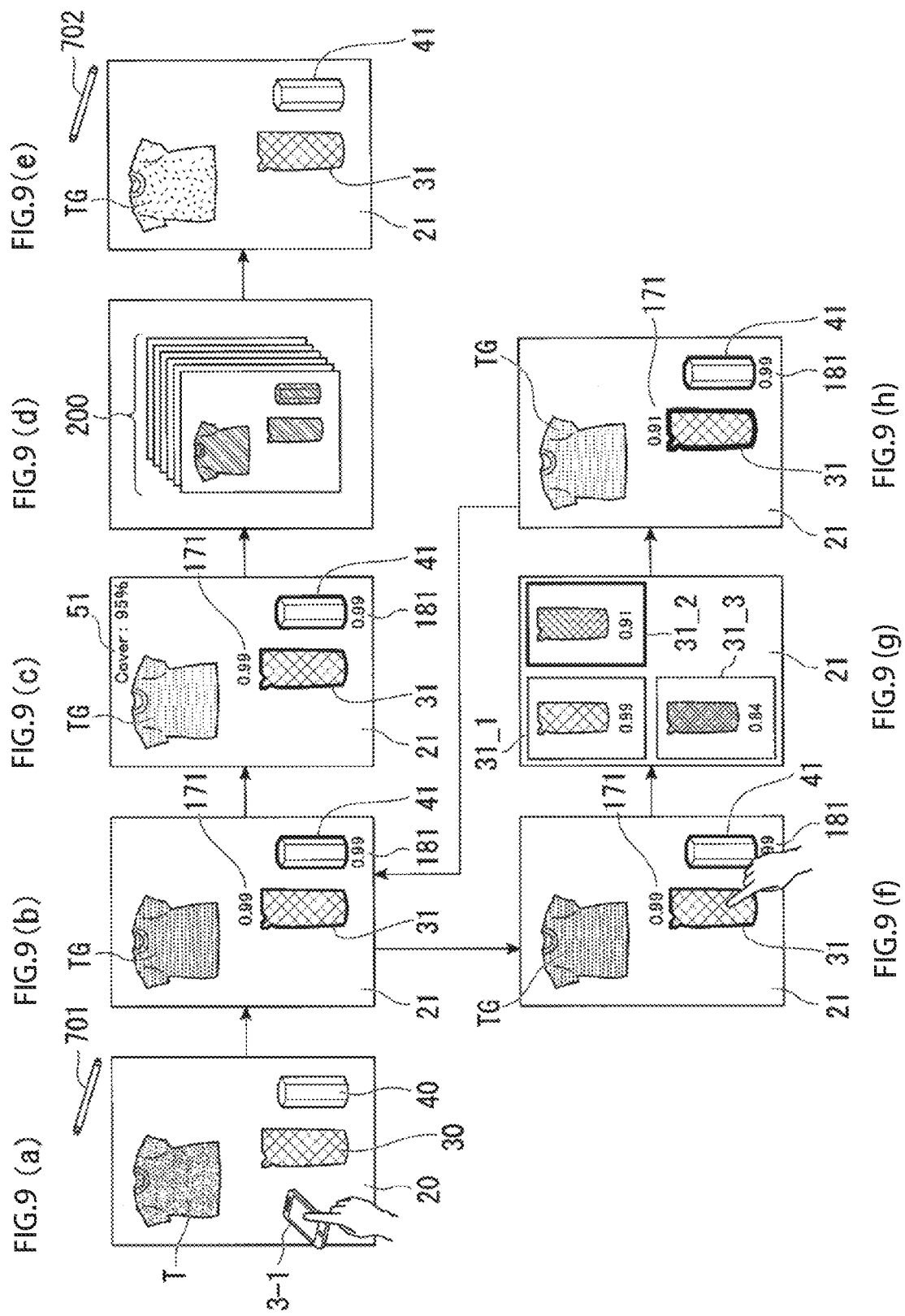

COLOR CORRESPONDENCE INFORMATION GENERATING SYSTEM, PROGRAM, AND METHOD OF GENERATING COLOR CORRESPONDENCE INFORMATION

CROSS-REFERENCE TO RELATED APPLICATIONS

The present application is a continuation of International Application No. PCT/JP2019/012075, filed Mar. 22, 2019, which is based upon and claims the benefits of priority to Japanese Application No. 2018-055205, filed Mar. 22, 2018. The entire contents of all of the above applications are incorporated herein by reference.

BACKGROUND OF THE INVENTION

Field of the Invention

The present invention relates to a color correspondence information generating system, a program, and a method of generating color correspondence information.

Discussion of the Background

When an image is obtained by capturing a target (hereinafter, referred to as captured target image) under ambient light of an arbitrary light source, and not under a standard light source, the color of the captured target image displayed on a display device may appear different from the actual color of a captured target. Therefore, there is a technique known as color management for correcting the color of the captured target image by matching the actual color of the target with the appearance of each color (visually recognized color) of the captured target image displayed on a display device.

For example, JP 2002-152768 discloses a technique for estimating spectral reflectance of a subject (target) by obtaining a captured image of the subject and a captured image of a designated chart consisting of a plurality of color charts having known spectral reflectance.

SUMMARY OF THE INVENTION

According to an aspect of the present invention, a color correspondence information generating system which generates color correspondence information indicating a correspondence relation between color information and color characteristic information using a first image obtained by capturing first objects under an environment of a light source, the color characteristic information indicating a characteristic of color represented by the color information, includes an object database that stores therein correspondences between recognition information for recognizing the respective first objects and the color characteristic information about the first objects recognized by the recognition information, an object recognition section that recognizes the first objects in the first image from the first image and the recognition information, and outputs image regions of the first objects in the first image and first color characteristic information, the first color characteristic information being the color characteristic information corresponding to the first objects, and a color correspondence information generation section that generates the color correspondence information which is a correspondence relation between the color information and the color characteristic information, using the color information and the first color characteristic information of pixels in the image regions. The color characteristic information and the recognition information have a one-to-one correspondence relation with each other, or the color characteristic information is the recognition information itself.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 9(a)-9(h) is a conceptual diagram illustrating a flow of processing performed by the image correction server 11A for generating a spectral image from a captured image.

DESCRIPTION OF THE EMBODIMENTS

Figures 1, 2:
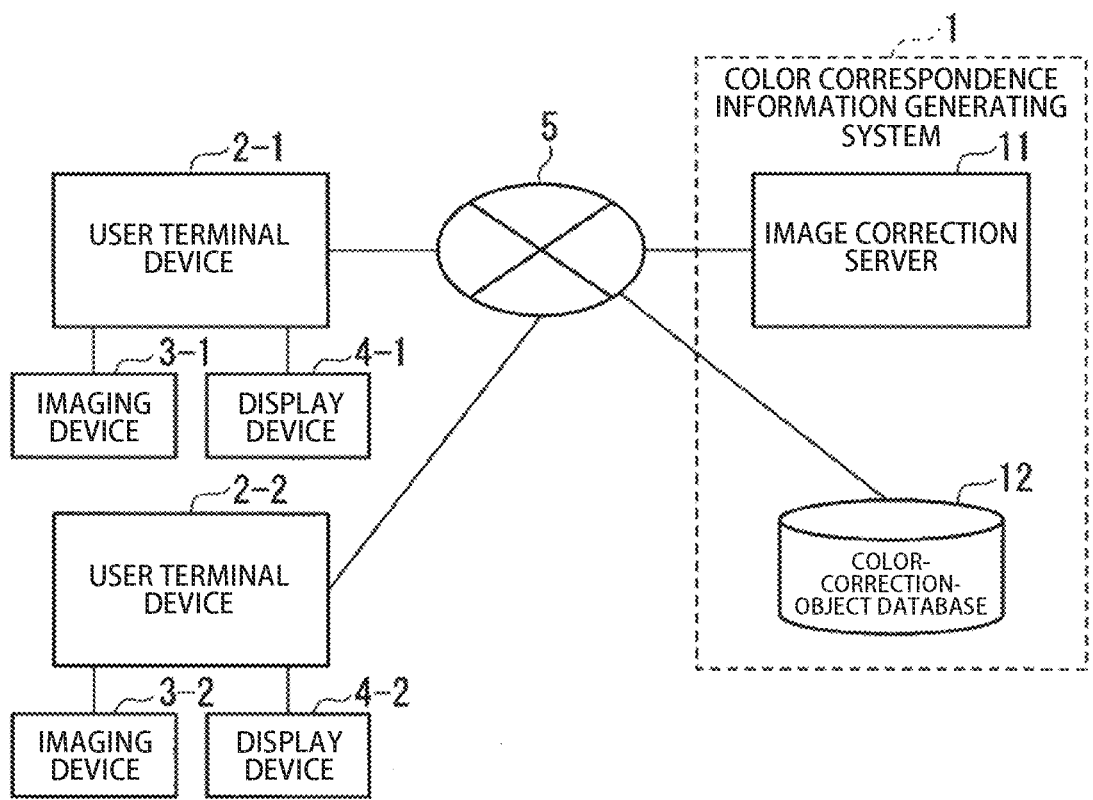
FIG. 1 is a block diagram illustrating a configuration example of a color correspondence information generating system according to a first embodiment of the present invention.
FIG. 2 is a diagram illustrating a configuration example of a color-correction object table previously written in a color-correction-object database 12.

The embodiments will now be described with reference to the accompanying drawings, wherein like reference numerals designate corresponding or identical elements throughout the various drawings.

The present invention describes two embodiments below: a first embodiment and a second embodiment. The first embodiment provides a method of correcting a captured image based on an RGB image of a color-correction object captured under ambient light of a standard light source (hereinafter, referred to as standard RGB image). The second embodiment provides a method of correcting a captured image on the basis of the spectral reflectance of the color-correction object.

In the following description, as an example of a captured image 20, a color-correction object and a subject for creating color correspondence information (an object different from the color correction object, for example, a target T described later, that is, a second object) are captured in the same image. Alternatively, a color-correction object may be captured in a captured image 20; color correspondence information may be prepared for a subject (for example, the target T, that is, second object described below) in another image (second image) captured in an environment of a light source that is the same (or similar) to the light source used for capturing the captured image 20; color characteristic information, such as the spectral reflectance and the standard RGB, may be estimated for the another image; and color correspondence information, such as a color conversion matrix and combinations of spectral energy distribution of the light source and spectral sensitivity of the imaging device, may be generated. The subject corresponding to a region other than the color correction object (including the background) in the captured image 20 (first image) or all other images (second image) or a part of the captured image 20 and the other images is an example of the second object. The term "part" refers to an image region not including the color-correction object (including single pixels), an image region in which the second object selected by the user resides, or an image region extracted through a contour extraction process of extracting an image region of an object in the captured image 20 or the other image.

In the first embodiment, a method of correcting a captured image based on a standard RGB image (first color characteristic information) of a color-correction object does not use the spectral reflectance of the color-correction object. Therefore, no device for measuring the spectral reflectance is required, and the captured image can be readily converted to a standard RGB image (second color characteristic information).

If the correspondence relation between pixel values are known for when the colorimetric value of the target to be captured matches the colorimetric value of the displayed image under an arbitrary image capturing condition (such as the sensitivity of the camera) and a display condition (such as the display characteristics of the display), it is possible to generate (color information estimation) an image that reproduces the color appearance of the target T from an image of the color-correction object captured under the image capturing condition and the standard RGB image of the captured image, when the image is displayed under the display condition. In the description below, it is presumed that the correspondence relation is known in the color information estimation according to the first embodiment.

The color information about a single reference color (for example, an RGB value) or a plurality of reference colors (for example, a combination of a plurality of RGB values) may be used as the first color characteristic information in place of the above-described standard RGB image.

In the second embodiment, a method of correcting a captured image on the basis of a spectral image (the first color characteristic information) of the color-correction object can generate a spectral image (the second color characteristic information) of the captured image.

If the correspondence relation between a pixel value and a colorimetric value under an arbitrary display condition (such as the display characteristics of the display) is known, it is possible to generate an image that reproduces the color appearance of the target T under ambient light of an arbitrary light source with higher accuracy than a correction method using reference color information, when the image is displayed under the display condition. In the second embodiment, it is presumed that the correspondence relation is known.

As the first color characteristic information, a single or a plurality of spectral reflectances may be used instead of a spectral image of the color-correction object described above.

The configuration example of a color correspondence information generating system in FIG. 1 will now be described with reference to the drawings.

FIG. 1 is a block diagram illustrating a configuration example of a color correspondence information generating system according to the first embodiment of the present invention.

In FIG. 1, a color correspondence information generating system 1 includes an image correction server 11 and a color-correction-object database 12. The color correspondence information generating system 1 is communicably connected to a user terminal device 2-1 and a user terminal device 2-2 via a network 5. The color correspondence information generating system 1 generates a standard RGB image of a captured image (the first embodiment as described below) of a target (captured target) at the presenting side, which is captured under an arbitrary light source, and performs a process of supplying an image that reproduces the color appearance of the target in the environment at the referring side using the standard RGB image generated for the referring side.

Here, the network 5 includes some or all of, for example, a wide area network (WAN), a local area network (LAN), the Internet, a provider device, a wireless base station, a dedicated line, and the like.

Each of the user terminal device 2-1 and the user terminal device 2-2 is a network terminal used by a user, such as a personal computer, a mobile phone, a smartphone, a tablet terminal, or the like. An image sharing application is installed on the user terminal devices 2-1 and 2-2. The image sharing application is application software that allows a user to share with other users, for example, a captured image of the target T captured using a camera of a smart phone. In the user terminal device in which the image sharing application is operated, for example, a user can share a captured image of the target T to be sold as goods to other users, and sell the goods to another user who viewed the captured image of the target T and decides to purchase the goods.

An imaging device 3-1 is a device, such as digital camera, which is connected to the user terminal device 2-1 and has an imaging function. The imaging device 3-1 may be an imaging function installed in the user terminal device 2-1. Similarly, an imaging device 3-2 is a device, such as digital camera, which is connected to the user terminal device 2-2 and has an imaging function. The imaging device 3-2 may be an imaging function installed in the user terminal device 2-2.

A display device 4-1 is a device having a display function connected to the user terminal device 2-1. The display device 4-1 is, for example, a liquid crystal display or the display function of the user terminal device 2-1. Similarly, a display device 4-2 is a device having a display function connected to the user terminal device 2-2. The display device 4-2 is, for example, a liquid crystal display or the display function of the user terminal device 2-2.

The color-correction-object database 12 previously stores the color characteristic information and object recognition information of the color-correction object used in place of a color chart in the present embodiment.

In this embodiment, at least a portion of the color-correction object registered in the color-correction-object database 12 is an object different from a color chart. The object different from the color chart is, for example, any one of containers, packages, external appearances, labels, and posters of products that are commercially available (available to a user), and is printed matter having a single color or a plurality of colors.

The color-correction object may be provided with one or more image-recognizable codes, such as a bar code or a QR code (registered trademark).

FIG. 2 is a diagram illustrating a configuration example of a color-correction object table previously written in the color-correction-object database 12. In the color-correction object table, items of color-correction-object identification information, first color characteristic information, and object recognition information are described for each record. The object recognition information is an example of recognition information.

Here, the color-correction-object identification information is identification information for identifying individual color-correction objects. In the first embodiment of the present invention the first color characteristic information is a standard RGB image (an image of a first object). In the second embodiment of the present invention, the first color characteristic information includes spectral reflectance and position information indicating a position (for example, each pixel and each region of the same color in the image) in the color-correction object indicating the spectral reflectance.

The standard RGB image is an image captured under ambient light of one specific standard light source, such as a standard light source D50 or a standard light source D65. The standard light source may be an arbitrary light source as long as it is unified into a specific single light source. The spectral reflectance may be estimated spectral reflectance (described below) that is estimated from plate-making data and the colorimetric value of a designated solid color. The object recognition information uses either image information of the color-correction object, a characteristic information of a shape and a color, or the color-correction-object identification information itself, and corresponds to a reference image or a spectral image (spectral reflectance) as the first color characteristic information in a one-to-one correspondence. For example, in the case where the object recognition information is a standard RGB image, the first color characteristic information may be the object recognition information itself.

First Embodiment

Figure 3:
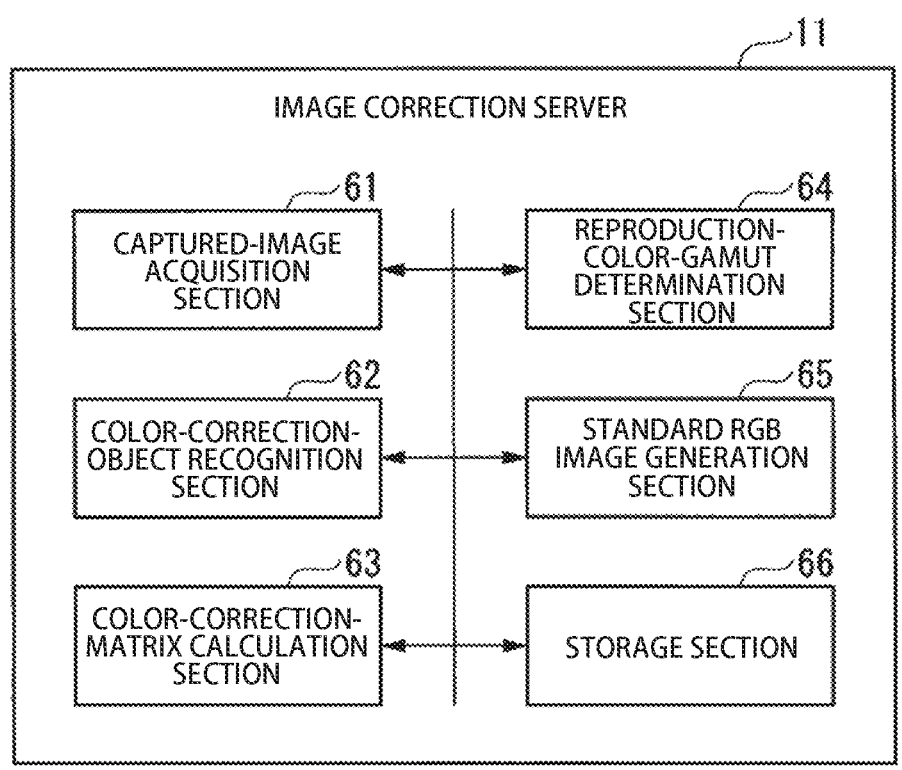
FIG. 3 is a block diagram illustrating a configuration example of an image correction server 11 of the color correspondence information generating system 1 according to the first embodiment.

FIG. 3 is a block diagram illustrating a configuration example according to the first embodiment of the image correction server 11 of the color correspondence information generating system 1 in FIG. 1. In FIG. 3, the image correction server 11 includes a captured-image acquisition section 61, a color-correction-object recognition section 62, a color-correction-matrix calculation section 63, a reproduction-color-gamut determination section 64, a standard RGB image generation section 65, and a storage section 66.

The captured-image acquisition section 61 receives a captured image from an external device, and writes and stores the captured image into the storage section 66. For example, the captured-image acquisition section 61 receives an image captured by the imaging device 3-1 from the user terminal device 2-1 and writes the image into the storage section 66. In the present embodiment, a side where the user terminal device 2-1 presents a captured image is described as a presenting side, and a side where the user terminal device 2-2 displays a captured image is described as a displaying side.

The color-correction-object recognition section 62 performs a process of recognizing an image region of the color-correction object in the captured image and extracts an image of the color-correction object in the captured image.

At this time, the color correction object recognition section 62 refers to the color-correction object table in the color-correction-object database 12, reads the object recognition information, and extracts an image corresponding to the object recognition information from the captured image. Here, in the case where the object recognition information is an image of the color-correction object (a template image), the color-correction-object recognition section 62 obtains the degrees of similarity between an image acquired by contour extraction from the captured image and the template image, as the recognition rate of the color-correction object. In the case where the object recognition information is characteristic information of the color-correction object (the characteristics such as shape and color), characteristic information is extracted from the image acquired by contour extraction from the captured image, the extracted characteristic information is compared with the characteristic information in the color-correction object table, and the degrees of similarity is calculated. In the case where the image-recognizable code, such as a barcode or a QR code (registered trademark), is captured in the captured image, the color-correction-object recognition section 62 may detect this. Furthermore, the detected result may be used for calculation of the degrees of similarity and for extraction of an image of the color-correction object. In such a case, one or a plurality of the codes are previously provided on the color-correction object. For example, if the codes are previously linked to the color-correction-object identification information, it is possible to maximize the degrees of similarity corresponding to the color-correction object linked to the code based on the detected result. If the positional relation between the shape of the color-correction object and the code is known, it is possible to extract an image of the color-correction object from the captured image based on the shape of the code and the positional relation of the codes (if a plurality of codes are provided) in the captured image. The method of calculating the degrees of similarity using the code and the method of extracting an image of the color-correction object may be performed in combination with another method (for example, a method that uses the template image or the characteristic information), or only one of the methods may be used.

The color-correction-object recognition section 62 performs contour extraction from the captured image displayed on the display screen of the display device 4-1 and displays a mark on the contour of the image recognized to be the color-correction object.

FIGS. 4(a)-4(h) is a conceptual diagram illustrating a flow of processing performed by the image correction server 11 for generating a standard RGB image from the captured image.

FIG. 4(a) illustrates a captured image 20 including a target T and each of the color-correction objects 30 and 40, captured by the imaging device 3-1 under ambient light of a first light source 701. That is, the captured image 20 is a single captured image including an image of the target T and each of the color-correction objects 30 and 40. The captured image 20 is an example of a first image. A second object is all or a part of the subjects captured in the captured image 20 (excluding the region of the images of the color-correction objects which are the first objects), or an image region selected by the user, or a subject corresponding to an image region extracted by contour extraction.

FIG. 4(b) illustrates an image TG of the target T and images 31 and 41 of the respective color-correction objects 30 and 40, displayed on the display screen 21 of the display device 4-1. The degrees of similarity 171 and 181 calculated by the color-correction-object recognition section 62 are respectively displayed near the images 31 and 41. The images 31 and 41 are each marked (for example, contour lines are displayed) with a contour.

In addition to what is shown in FIG. 4(b), FIG. 4(c) shows a value 51 which indicates the color gamut coverage percentage or the reproduction color sufficiency percentage based on the standard RGB image of the selected color-correction object. The standard RGB image is an example of first color characteristic information.

FIG. 4(d) illustrates a color-correction matrix 100 (described below) generated by the color-correction-matrix calculation section 63. The color-correction matrix is an example of color correspondence information.

FIG. 4(e) illustrates an image (second color characteristic information) in which a color appearance of the target T under ambient light of a standard light source is reproduced from the captured image 20 and the color-correction matrix 100.

FIG. 4(f) illustrates that the user selects a color-correction object to be used for estimating the color-correction matrix.

FIG. 4(g) illustrates a candidate group of the selected color-correction object (images 31_1, 31_2, and 31_3 of the color-correction object) displayed on the display screen 21.

FIG. 4(h) illustrates a display enhancing the contour (for example, changing the color and/or thickness of the contour line) marked in the image 31 to inform the user about the color-correction object corresponding to the image 31 being selected as a result of the user selecting the color-correction object from a candidate group of color-correction objects in FIG. 4(g).

Referring back to FIG. 3, the color-correction-object recognition section 62 sends the captured image 20 to the user terminal device 2-1, as illustrated in FIG. 4(b). The user terminal device 2-1 displays the received captured image 20 on the display screen 21 of the display device 4-1. The color-correction-object recognition section 62 also sends, to the user terminal device 2-1, the obtained degrees of similarity 171 and 181 of the respective color-correction objects 30 and 40 and the respective contours (information indicating the image region) of the color-correction objects 30 and 40. In the captured image 20 on the display screen 21, the user terminal device 2-1 displays each of the degrees of similarity 171 and 181 of the color-correction objects 30 and 40 in the vicinity of the corresponding images 31 and 41 of which contours are marked (for example, the contour lines are indicated).

Note that, when the captured image 20 is stored in the user terminal device 2-1, the color-correction-object recognition section 62 may send only the degrees of similarity and the contours to the user terminal device 2-1.

When the color correction object recognition section 62 obtains the degrees of similarity by comparing the image of a color-correction object in the captured image and the template image in the color-correction object table in the color-correction-object database 12 and when the obtained degrees of similarity is, for example, smaller than a predetermined degrees of similarity threshold, the color correction object recognition section 62 allows the user to select which candidate image of the color-correction objects is to be displayed, as shown in FIG. 4(f).

The color-correction-object recognition section 62 then sends the template images of a plurality of color-correction objects having a predetermined range of degrees of similarity to the image 31 of the selected color-correction object, to the user terminal device 2-1 as candidates of the color-correction object. The user terminal device 2-1 displays the candidates on the display screen 21 of the display device 4-1, as in FIG. 4(g). In this way, for example, when the user selects the image 31_2, as illustrated in FIG. 4(g), the user terminal device 2-1 sends designated information indicating that the image 31_2 has been designated to the color correspondence information generating system 1. The color-correction-object recognition section 62 uses the standard RGB image corresponding to the image 31_2 when the image 31 of the color-correction object in the captured image corresponds to the image 31_2. Similarly, the same process is performed on the image 41 of the color-correction object in FIG. 4(f), and the standard RGB image of the image 41 to be used for color correction is extracted.

The color-correction-matrix calculation section 63 refers to the color-correction object table in the color-correction-object database 12 and reads the standard RGB image corresponding to the color-correction object that is to be used.

The color-correction-matrix calculation section 63 then uses the following formula (1) to calculate, by multiple regression analysis or the like, a color-correction matrix M from pixel values of the captured image, so that pixel values of the standard RGB image of the color-correction object read from the color-correction-object database 12 become the solution.

In formula (1), R, G, and B is a pixel value of the respective red, green, and blue color components of the standard RGB image of the color-correction object read from the color correction object database 12. Each of R', G', and B' is a pixel value of the respective red, green, and blue color components of the color-correction object recognized from the captured image. M represents a 3×3 matrix for converting the pixel values of the captured image captured under ambient light of the first light source 701 to pixel values of the captured image captured under ambient light of a reference light source 700, and is represented by formula (2).

(Math. 1)

$$\begin{bmatrix} R \\ G \\ B \end{bmatrix} = M \cdot \begin{bmatrix} R' \\ G' \\ B' \end{bmatrix} \quad (1)$$

(Math. 2]

$$M = \begin{bmatrix} C_{11} & C_{12} & C_{13} \\ C_{21} & C_{22} & C_{23} \\ C_{31} & C_{32} & C_{33} \end{bmatrix} \quad (2)$$

The reproduction-color-gamut determination section 64 creates a subspace (a subspace in an RGB coordinate system) constituted by pixel values of pixels in a region of the color-correction object in the captured image. The reproduction-color-gamut determination section 64 then obtains pixel values of the entire captured image or the region of the target T in the captured image, and calculates the reproduction color sufficiency percentage as a rate (ratio) at which the pixel values are included in the subspace. That is, the reproduction color sufficiency percentage is the ratio of the pixel values in the entire captured image or the region of the target T, included in the subspace in the RGB coordinate system derived from the color-correction objects in the captured image. The reproduction-color-gamut determination section 64 sends the calculated reproduction color sufficiency percentage to the user terminal devices 2-1 and 2-2, and notifies them by displaying the reproduction color sufficiency percentage on the display device 4-1 and 4-2.

The reproduction-color-gamut determination section 64 calculates an occupancy ratio of the reproduction color gamut calculated from the standard RGB images corresponding to the color-correction objects relative to the standard color gamut (color space), such as a standard sRGB or AdobeRGB color gamut, that is, the color gamut coverage percentage. The reproduction-color-gamut determination section 64 presents the calculated color gamut coverage percentage to the user.

Figure 5:
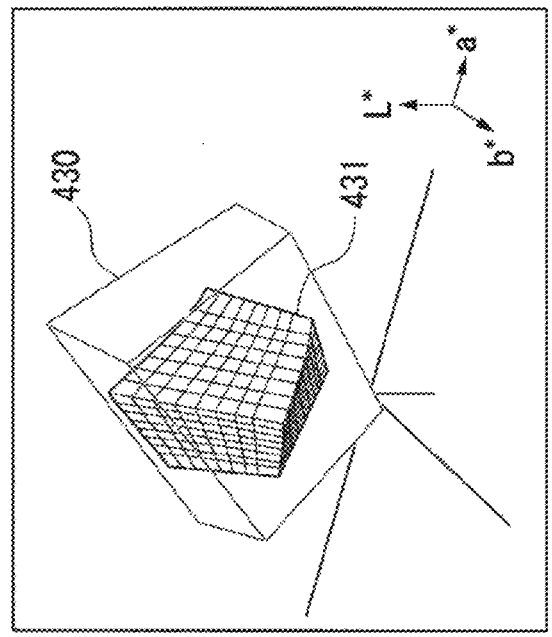
FIG. 5(a) and FIG. 5(b) is a conceptual diagram illustrating a reproduction color sufficiency percentage and a color gamut coverage percentage calculated by a reproduction-color-gamut determination section 64.
Figure 5:
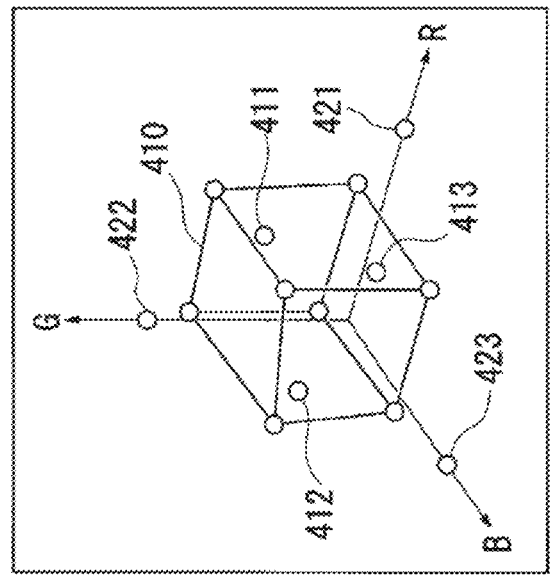

FIG. 5(a) and FIG. 5(b) is a conceptual diagram illustrating the reproduction color sufficiency percentage and the color gamut coverage percentage calculated by the reproduction-color-gamut determination section 64.

FIG. 5(a) is a diagram illustrating an RGB coordinate system of a three-dimensional space including a color component R axis, a color component G axis, and a color component B axis for describing a reproduction color sufficiency percentage. FIG. 5(a) illustrates a subspace 410 generated by the reproduction-color-gamut determination section 64 in a three-dimensional shape.

Each of the reproduction color points 411, 412, and 413 indicates the coordinates of pixel values included in the subspace 410. Each of the reproduction color points 421, 422, and 423 indicates the coordinates of pixel values not included in the subspace 410. In this case, since there are six pixel values and three pixel values are included in the subspace 410, the reproduction color sufficiency percentage is 50.0% ((3/6)*100).

FIG. 5(b) illustrates an L*a*b* coordinate system for describing color gamut coverage percentage. A reproduction color gamut 431 is configured by calculating the colorimetric value of each pixel from a standard RGB image of a color-correction object and arranging the colorimetric values in an L*a*b* space. The color gamut coverage percentage indicates an occupancy ratio of portion of the reproduction color gamut 431 included in the standard color space 430 relative to the volume of the standard color space 430. For example, if the volume of the color space 430 is 50 (in an arbitrary unit), and the volume of the portion of the reproduction color gamut 431 included in the color space 430 is 30, the color gamut coverage percentage is 60% ((30/50)*100).

The standard RGB image generation section 65 uses the color-correction matrix calculated by the color-correction-matrix calculation section 63 and generates a standard RGB image (second color characteristic information), which is an image that reproduces a color appearance of the target T captured in an environment of a reference light source, from the captured image acquired by the captured-image acquisition section 61.

The storage section 66 temporarily stores data, such as a captured image and a color-correction matrix, to be processed by the image correction server 11.

Figure 6:
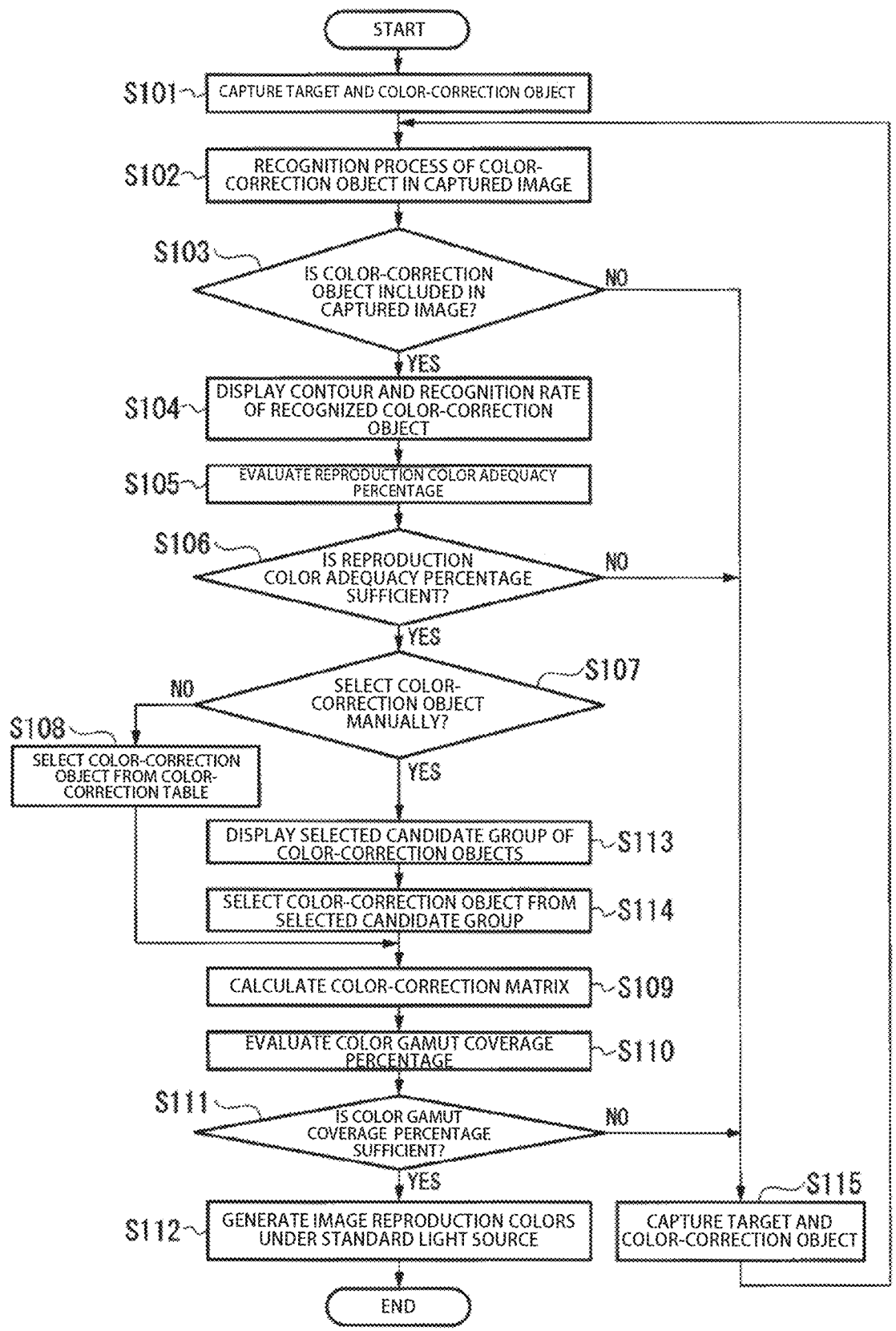
FIG. 6 is a flow chart illustrating the operation of a process for generating a captured image, which is captured under ambient light of a reference light source, using a captured image on the presenting side, performed by an image correction system according to the present embodiment.

FIG. 6 is a flowchart of an operation example of the process for generating, from a captured image, a captured image captured under ambient light of a standard light source (the reference light source 700), performed by the color correspondence information generating system according to the present embodiment. The process of generating, from a captured image, a captured image under ambient light of a standard light source, performed by the color correspondence information generating system will be explained with reference to FIGS. 1, 2, 4, and 6.

Step S101:

The user captures a captured image 20 with the imaging device 3-1, as illustrated in FIG. 4(a), and sends the captured image 20 from the user terminal device 2-1 to the image correction server 11 via the network 5.

Step S102:

The captured-image acquisition section 61 receives the captured image 20, and writes and stores the captured image 20 into the storage section 66.

The color-correction-object recognition section 62 performs contour extraction from each image in the captured image 20, and extracts an image within the contour. The color-correction-object recognition section 62 calculates the degrees of similarity by comparing the image with the template image or comparing each of the characteristic values.

Step S103:

The color correction object recognition section 62 determines whether the degrees of similarity of each extracted image is equal to or greater than a predetermined degrees of similarity threshold, that is, whether a color-correction object registered in the color-correction object table in the color-correction-object database 12 is included in the captured image 20.

At this time, if the degrees of similarity of any of the extracted images are equal to or greater than the predetermined degrees of similarity threshold, the color-correction-object recognition section 62 determines that a color-correction object is included in the captured image 20 and advances the process to step S104. If the degrees of similarity of all the extracted images are smaller than the predetermined degrees of similarity threshold, the color-correction-object recognition section 62 determines that a color-correction object is not included in the captured image 20 and advances the process to step S115.

Figure 4:
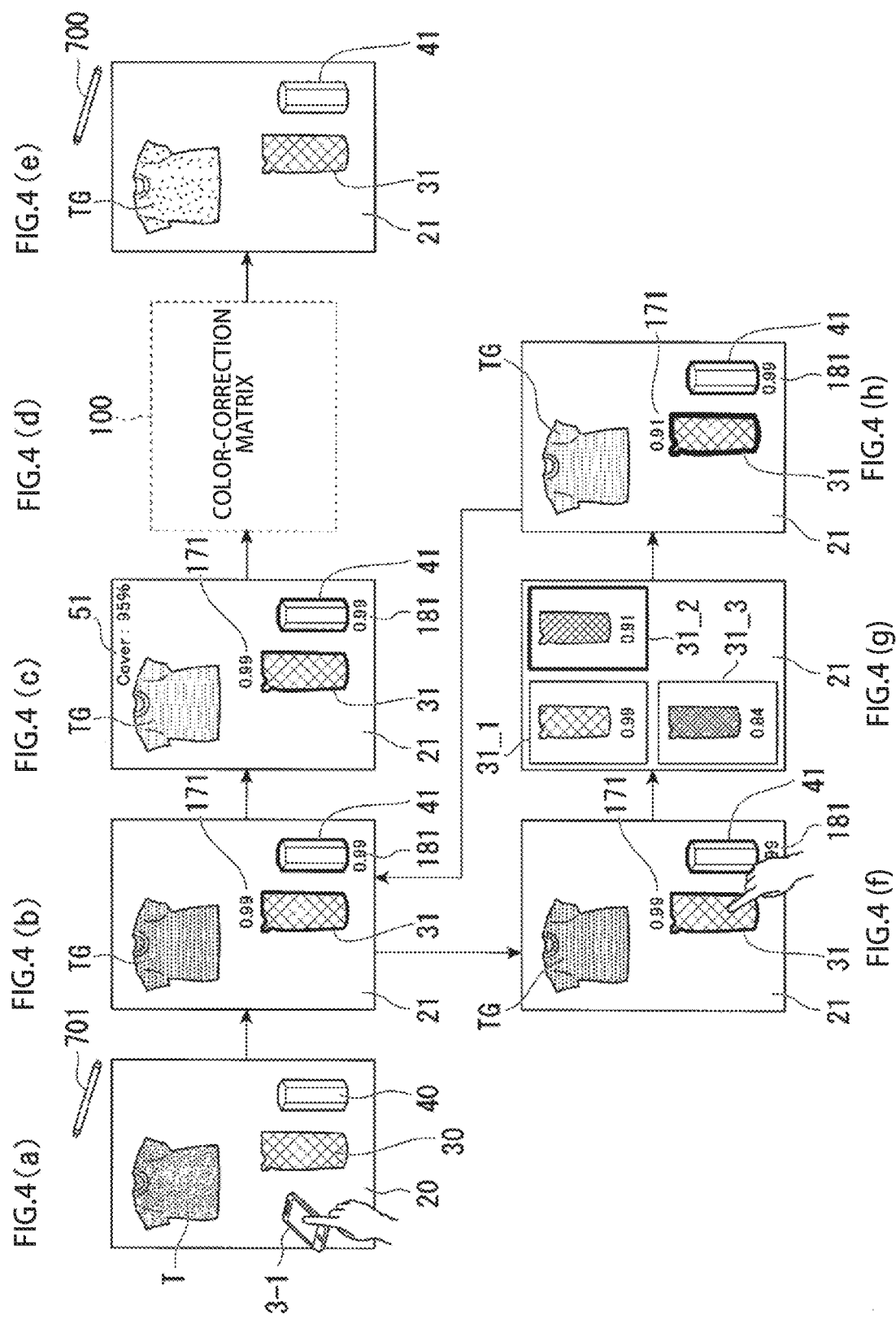
FIGS. 4(a)-4(h) is a conceptual diagram illustrating a flow of processing performed by the image correction server 11 for generating, from a captured image, an image captured under ambient light of a reference light source.

Step S104:

The color-correction-object recognition section 62 sends the image of the color-correction objects (first objects) included in the captured image 20 and the contours (information indicating image regions) of the recognized images (31 and 41), to the user terminal device 2-1. The user terminal device 2-1 marks the recognized images with a line of a predetermined thickness (example of image region information), as illustrated in FIG. 4(*b*), and displays degrees of similarity (171 and 181) near the recognized images on the display screen 21 of the display device 4-1.

Step S105:

The reproduction-color-gamut determination section 64 creates a subspace constituted by pixel values of pixels in the region of the color-correction object in the captured image 20. The reproduction-color-gamut determination section 64 then calculates the reproduction color sufficiency percentage which is the ratio of the pixel value of each pixel in the entire captured image 20 or the region of the target T, included in the subspace.

When a plurality of color-correction objects are captured in the captured image 20, the reproduction-color-gamut determination section 64 may calculate the reproduction color sufficiency percentage based on a space obtained by synthesizing subspaces each of which is constituted by pixel values of pixels in a region of each of a plurality of color-correction objects in the captured image 20.

Step S106:

The reproduction-color-gamut determination section 64 determines whether the obtained reproduction color sufficiency percentage is equal to or greater than a predetermined sufficiency percentage threshold.

At this time, if the reproduction color sufficiency percentage is equal to or greater than the predetermined sufficiency percentage threshold, and the reproduction color gamut is sufficient for reproducing colors, the reproduction-color-gamut determination section 64 advances the process to step S107. If the reproduction color sufficiency percentage is smaller than the predetermined sufficiency percentage threshold, and the reproduction color gamut is insufficient for reproducing colors, the reproduction-color-gamut determination section 64 advances the process to step S115.

The reproduction-color-gamut determination section 64 may determine that the reproduction color gamut is sufficient for reproducing a color when the reproduction color sufficiency percentage is equal to or greater than the sufficiency percentage threshold.

The reproduction-color-gamut determination section 64 may send the reproduction color sufficiency percentage to the user terminal devices 2-1 and 2-2, and may allow the user to determine whether the reproduction color sufficiency percentage is sufficient. At this time, the reproduction-color-gamut determination section 64 uses the acceptability determination result by the user received from the user terminal devices 2-1 and 2-2 as acceptability determination information (either acceptability or unacceptability).

Step S107:

When there are a plurality of color-correction objects having template images of the color correction objects or characteristic values, in which the degrees of similarity of the extracted images are within the predetermined numerical range, the color-correction-object recognition section 62 displays the color-correction objects having degrees of similarity within the predetermined numerical range on the display screen 21 of the display device 4-1 and allows the user to decide whether to manually select a color-correction object.

At this time, if the user decides not to manually select a color-correction object, the color-correction-object recognition section 62 advances the process to step S108. If the user decides to manually select a color-correction object, the color-correction-object recognition section 62 advances the process to step S113.

Step S108:

The color-correction-object recognition section 62 extracts each color-correction object having the highest degree of similarity to the image from a color correction table for each image of the color correction object in the captured image 20.

Step S109:

The color-correction-matrix calculation section 63 refers to the color-correction-object database 12 and reads the standard RGB images of the color-correction objects extracted by the color correction object recognition section 62, from the color-correction table.

The color-correction-matrix calculation section 63 then uses the above-described formula (1) to calculate, by multiple regression analysis or the like, a color-correction matrix from the pixel values of the color-correction objects in the captured image 20 using, so that the pixel values of the standard RGB images corresponding to the color-correction objects become the solution.

Step S110:

The reproduction-color-gamut determination section 64 calculates the color gamut coverage percentage being an occupancy ratio of the reproduction color gamut calculated from the standard RGB image corresponding to a color-correction object relative to a standard color space.

Alternatively, the color gamut coverage percentage may be calculated from a reproduction color gamut obtained by synthesizing the respective color gamut reproduced from the standard RGB images corresponding to each of a plurality of color-correction objects.

Step S111:

The reproduction-color-gamut determination section 64 then determines whether the obtained color gamut coverage is equal to or greater than a predetermined coverage threshold, that is, whether the reproduction color gamut has a sufficient range for the reproduction of the colors of the pixels in the captured image 20.

At this time, if the color gamut coverage is equal to or greater than a predetermined percentage threshold, the reproduction-color-gamut determination section 64 advances the process to step S112. If the color gamut coverage is smaller than the predetermined coverage threshold, the reproduction-color-gamut determination section 64 advances the process to step S115.

The reproduction-color-gamut determination section 64 may send the color gamut coverage to the user terminal devices 2-1 and 2-2 and allow the user to determine whether the color gamut coverage is sufficient. At this time, the reproduction-color-gamut determination section 64 uses the acceptability determination result by the user received from the user terminal devices 2-1 and 2-2 as acceptability determination information (either acceptability or unacceptability).

Step S112:

The standard RGB image generation section 65 generates an image that reproduces the colors when the image is captured under ambient light of the reference light source 700, using the captured image and the color-correction matrix. The standard RGB image generation section 65 may send the generated display image to the user terminal device 2-1.

Step S113:

As illustrated in FIG. 4(*f*), the color-correction-object recognition section 62 prompts the user to select which of the candidate images of color-correction objects corresponding to each of the images 31 and 41 are to be displayed.

The color-correction-object recognition section 62 then displays each of images 31_1, 31_2, and 31_3 of a plurality of color-correction objects having a predetermined range of degrees of similarity to the image 31 of the selected color-correction object as candidates (candidate group) of the color-correction object, on the display screen 21 of the display device 4-1 of the user terminal device 2-1, as illustrated in FIG. 4(g). Here, the color-correction-object recognition section 62 generates thumbnail images corresponding to each of the candidates, in a one-to-one correspondence, and sends the thumbnail images and the degrees of similarity of the respective candidates calculated by the color-correction-object recognition section 62 to the user terminal device 2-1.

Then, the user terminal device 2-1 displays each of the received thumbnail images and the degrees of similarity of the candidates corresponding to the respective thumbnail images in combination on the display screen 21 of the display device 4-1.

Step S114:

When the user selects an image of a color-correction object from the candidates, the user terminal device 2-1 sends information showing the thumbnail image selected by the user, that is, designated information indicating which of a plurality of thumbnail image candidates has been designated, to the color-correction-object recognition section 62.

When the designated information indicating the thumbnail image selected by the user is sent from the user terminal device 2-1, the color-correction-object recognition section 62 displays images of the candidates of another type of color-correction object on the display screen 21 of the display device 4-1, sequentially selects the color-correction objects in the captured image 20, and extracts the standard RGB images.

Note that, in the configuration described above, a character string (for example, product name) having a one-to-one correspondence with the color-correction object may be used in place of a thumbnail image.

Step S115:

If it is determined that the color-correction object is not included in the captured image 20, or if the reproduction color sufficiency percentage is smaller than a predetermined threshold, or if the color gamut coverage percentage is smaller than a predetermined threshold, the color-correction-object recognition section 62 sends, to the user terminal device 2-1, information indicating to the user that the captured image 20 cannot be used for the generation of color correspondence information (acceptability determination information indicating unacceptability) at this time.

When the user terminal device 2-1 receives the acceptability determination information indicating unacceptability from the color-correction-object recognition section 62, the user terminal device 2-1 displays a display prompting the addition of another type of color-correction object on the display screen 21 of the display device 4-1, and notifies the user about the addition of another type of color-correction object.

In response to this, the user adds another type of color-correction object in addition to the color-correction object imaged together with the target T at this time.

If the color correction object recognition section 62 cannot retrieve an image having a degree of similarity selected from a predetermined range of both the images 31 and 41 of the color-correction object from the color-correction-object database 12, the color correction object recognition section 62 may send the highest degree of similarity not included in the predetermined range and the information of unacceptability (acceptability determination information indicating unacceptability) to the user terminal device 2-1.

The user terminal device 2-1 then displays the degrees of similarity on the display screen 21 of the display device 4-1. Here, the user refers to the degrees of similarity displayed on the display device 4-1, determines whether the image can be used for color correction, and sends the determination result from the user terminal device 2-1 to the color correspondence information generating system 1.

Second Embodiment

Figure 7:
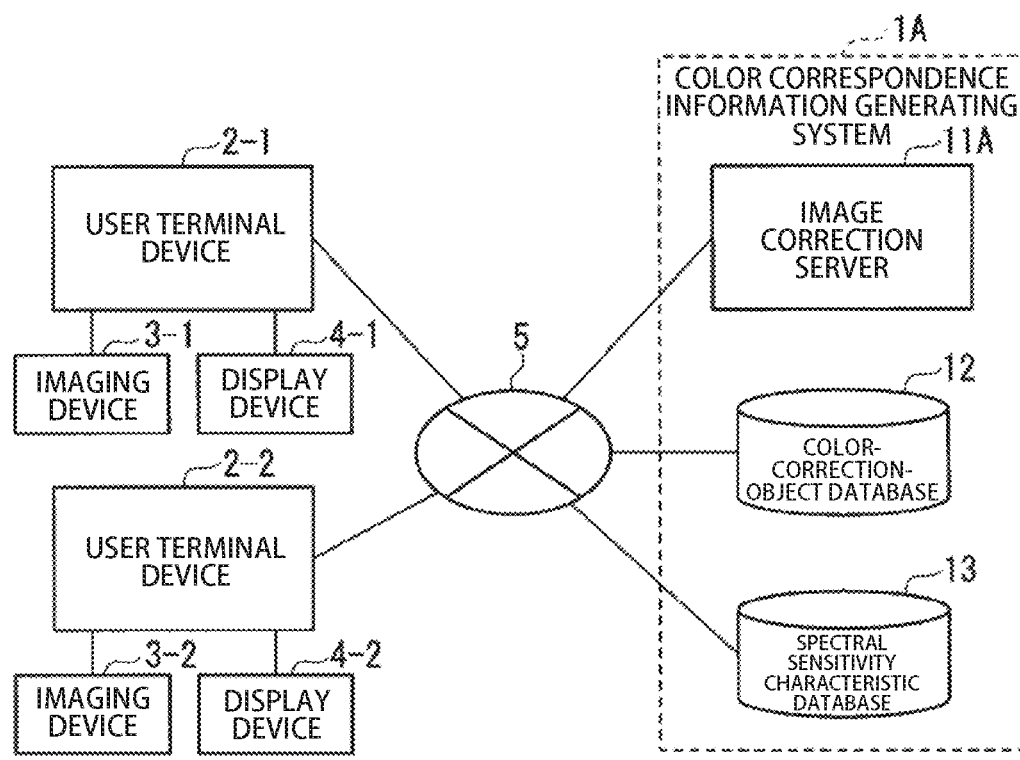
FIG. 7 is a block diagram illustrating a configuration example of a color correspondence information generating system according to a second embodiment of the present invention.

FIG. 7 is a block diagram illustrating a configuration example of a color correspondence information generating system according to the second embodiment of the present invention. In FIG. 7, a color correspondence information generating system 1A includes an image correction server 11A, a color-correction-object database 12, and a spectral sensitivity characteristic database 13. The color correspondence information generating system 1A is communicably connected to a user terminal device 2-1 and a user terminal device 2-2 via a network 5, as in the color correspondence information generating system 1 in FIG. 1. The color correspondence information generating system 1A generates a spectral image of a captured image (the second embodiment as described below) of a target (captured target) at the presenting side, which is captured under an arbitrary light source, and performs a process of supplying an image that reproduces a color appearance of the target in the environment at the referring side using the spectral image generated for the referring side. The image correction server 11A will be described below. The color-correction-object database 12 is the same as that in the color correspondence information generating system 1 in FIG. 1. The spectral sensitivity characteristic database 13 writes and stores a spectral sensitivity characteristic table in which device identification information (for example, model information) is correlated with spectral sensitivity characteristics of the imaging device when the spectral sensitivity characteristics of the imaging device (for example, the imaging devices 3-1 and 3-2) to be used are known. When a spectral energy distribution estimation section 73 (described below) uses the spectral energy distribution of the light source and the spectral sensitivity characteristics of the imaging device as color correspondence information, the spectral energy distribution estimation section 73 refers to the table in the spectral sensitivity characteristic database 13, reads the spectral sensitivity characteristics corresponding to the model of the imaging device used, and uses the read spectral sensitivity characteristics.

Figure 8:
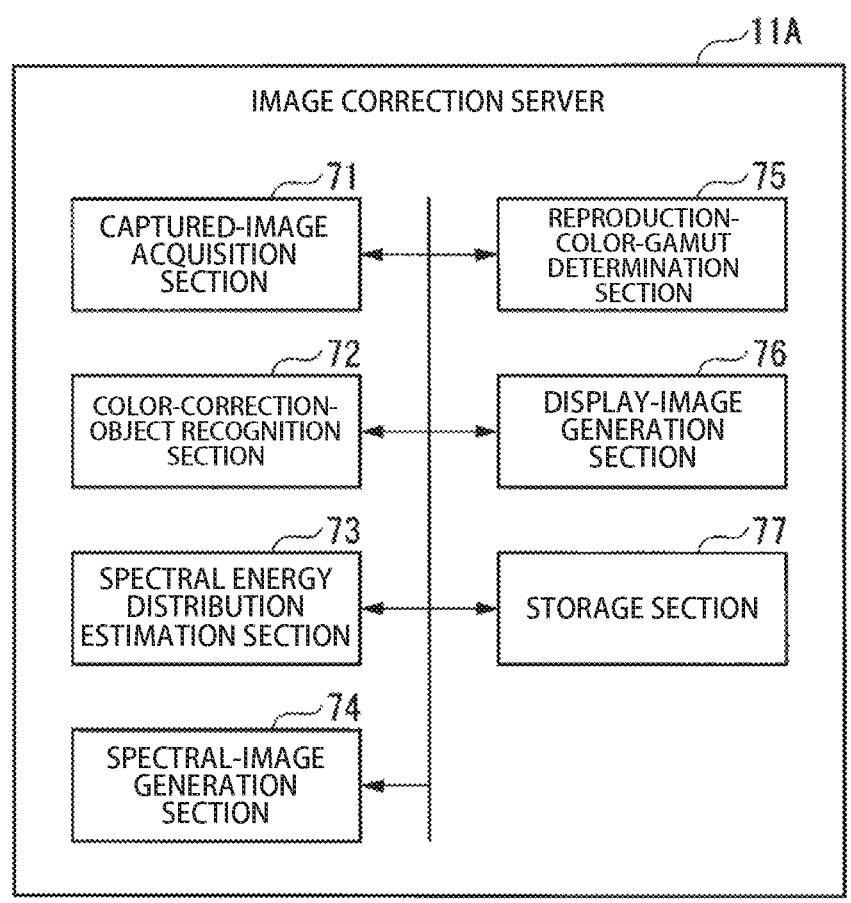
FIG. 8 is a block diagram illustrating a configuration example of an image correction server 11A of a color correspondence information generating system 1A according to the second embodiment.

FIG. 8 is a block diagram illustrating a configuration example of the image correction server 11A of the color correspondence information generating system 1A in FIG. 7. In FIG. 8, the image correction server 11A includes a captured-image acquisition section 71, a color-correction-object recognition section 72, a spectral energy distribution estimation section 73, a spectral-image generation section 74, a reproduction-color-gamut determination section 75, a display-image generation section 76, and a storage section 77.

The captured-image acquisition section 71 receives an input of a captured image from an external device, and writes and stores the image into the storage section 77. For example, the captured-image acquisition section 71 receives an image captured by the imaging device 3-1 from the user terminal device 2-1 and writes the image into the storage section 77. In the present embodiment, a side where the user terminal device 2-1 presents a captured image is described as a presenting side, and a side where the user terminal device 2-2 displays a captured image is described as a displaying side.

The color-correction-object recognition section 72 performs a process of recognizing an image region of the color-correction object in a captured image and extracts an image of the color-correction object from the captured image.

At this time, the color correction object recognition section 72 refers to a color-correction object table in the color-correction-object database 12, reads object recognition information, and extracts an image corresponding to the object recognition information from the captured image. Here, in the case where the object recognition information is an image of a color-correction object (template image), the color-correction-object recognition section 72 obtains the degrees of similarity between an image acquired by contour extraction from the captured image and the template image, as the recognition rate of the color-correction object. In the case where the object recognition information is characteristic information of the color-correction object (the characteristics such as shape and color), characteristic information is extracted from the image acquired by contour extraction from the captured image, the extracted characteristic information is compared with the characteristic information in the color-correction object table, and the degrees of similarity is calculated. As in the first embodiment, the color-correction-object recognition section 72 may use an image-recognizable code, such as a barcode or a QR code (registered trademark), to calculate degrees of similarity and extract an image of the color-correction object.

The color-correction-object recognition section 72 performs contour extraction from the captured image displayed on the display screen of the display device 4-1 and displays a mark on the contour in the image recognized to be the color-correction object.

FIGS. 9(a)-9(h) is a conceptual diagram illustrating a flow of processing performed by the image correction server 11A for generating a spectral image from the captured image.

FIG. 9(a) illustrates a captured image 20 including a target T and color-correction objects 30 and 40, captured by the imaging device 3-1 under ambient light of a first light source 701. That is, the captured image 20 is a single captured image including the target T and each of the color-correction objects 30 and 40 as a subject. The first light source 701 is an example of a first light source. The captured image 20 is an example of a first image. A subject corresponding to all or part of the remaining image region except the image region of color correction objects in the captured image 20 is an example of a second object. The target T is an example of a second object. As described above, in the case where the color correction objects are captured in the captured image 20, the second object may be a subject corresponding to all or a portion of other captured image captured in an environment of the same light source as that of the captured image 20. In such a case, for example, the color-correction objects are captured in the captured image 20, whereas the target T is captured in another captured image.

FIG. 9(b) illustrates an image TG of the target T and images 31 and 41 of the respective color-correction objects 30 and 40, displayed on the display screen 21 of the display device 4-1. The degrees of similarity 171 and 181 calculated by the color-correction-object recognition section 72 are respectively displayed near the images 31 and 41. The images 31 and 41 are each marked (for example, contour lines are displayed) with a contour.

In addition to what is shown in FIG. 9(b), FIG. 9(c) shows a value 51 which indicates the color gamut coverage percentage or the reproduction color sufficiency percentage based on the spectral reflectance of the selected color-correction object. The spectral reflectance is an example of first color characteristic information.

FIG. 9(d) illustrates spectral images 200 (described below) generated by a spectral-image generation section 74. The spectral image 200 is an example of second color characteristic information.

FIG. 9(e) illustrates a display image based on the captured image 20 acquired by generating (correcting) the spectral images 200 with the spectral energy distribution of the first light source 701. The spectral energy distribution of the light source and the spectral sensitivity characteristics of the imaging device 3-1 are examples of color correspondence information.

FIG. 9(f) illustrates that the user selects a color-correction object to be used for estimating the spectral energy distribution.

FIG. 9(g) illustrates a candidate group of the selected color-correction object (images 31_1, 31_2, and 31_3 of the color-correction object) displayed on the display screen 21.

FIG. 9(h) illustrates a display enhancing the contour (for example, changing the color and/or thickness of the contour line) marked in the image 31 to inform the user about the color-correction object corresponding to the image 31 being selected as a result of the user selecting the color-correction object from a candidate group of color-correction objects in FIG. 9(g).

Referring back to FIG. 8, the color-correction-object recognition section 72 sends the captured image 20 to the user terminal device 2-1, as illustrated in FIG. 9(b). The user terminal device 2-1 displays the captured image 20 on the display screen 21 of the display device 4-1. Additionally, the color-correction-object recognition section 72 sends, to the user terminal device 2-1, the degrees of similarity 171 and 181 of the obtained color-correction objects 30 and 40 and the respective contours (information indicating the image region) of the color-correction objects 30 and 40 together with the captured image 20. In the captured image 20 on the display screen 21, the user terminal device 2-1 displays each of the degrees of similarity 171 and 181 of the color-correction objects 30 and 40 in the vicinity of the corresponding images 31 and 41 of which contours are marked (for example, the contour lines are indicated).

Note that, when the captured image 20 is stored in the user terminal device 2-1, the color-correction-object recognition section 72 may send only the degrees of similarity and the contours to the user terminal device 2-1.

When the color correction object recognition section 72 obtains the degrees of similarity by comparing the image of a color-correction object in the captured image and the template image in the color-correction object table in the color-correction-object database 12 and when the obtained degrees of similarity is, for example, smaller than a predetermined degrees of similarity threshold, the color correction object recognition section 72 allows the user to select which candidate image of the color-correction objects is to be displayed, as shown in FIG. 9(f).

The color-correction-object recognition section 72 then sends the template images of a plurality of color-correction objects having a predetermined range of degrees of similarity to the image 31 of the selected color-correction object, to the user terminal device 2-1 as candidates of the color-correction object. The user terminal device 2-1 displays template images of the candidates of the color-correction objects on the display screen 21 of the display device 4-1, as in FIG. 9(g). For example, when the user selects the image 31_2, as illustrated in FIG. 9(g), the user terminal device 2-1 sends designated information indicating that the image 31_2 has been designated to the color correspondence information generating system 1A. The color-correction-object recognition section 72 uses the spectral reflectance corresponding to the image 31_2 because the image 31 of the color-correction object in the captured image corresponds to the image 31_2. Similarly, the same process is performed on the image 41 of the color-correction object in FIG. 9(f), and the spectral reflectance of the image 41 to be used for color correction is extracted.

The spectral energy distribution estimation section 73 refers to the color-correction object table in the color-correction-object database 12 and reads the spectral reflectance corresponding to the color-correction object that is to be used. The spectral energy distribution estimation section 73 calculates the spectral energy distribution of the light source by multiple regression analysis or the like, from the spectral sensitivity characteristics of the imaging device and the spectral reflectance of the color-correction object, using the following formula (3) so that the pixel values of the captured image become a solution. In the description above, it is presumed that the spectral sensitivity characteristics of the imaging device are known. Alternatively, the spectral energy distribution of the light source and the spectral sensitivity of the imaging device may be simultaneously estimated through an optimization technique. In the estimation of the spectral energy distribution of the light source, a principal component vector may be previously calculated from the spectral energy distribution of typical light source, and the spectral energy distribution of the light source may be estimated as the synthesis of these vectors.

In formula (3), Each of R, G, and B is a pixel value of the color-correction object recognized from the captured image; $Sk(\lambda)$ is the spectral sensitivity characteristics ($r\lambda1, \ldots, r\lambda n$, $g\lambda1, \ldots, g\lambda n$, $b\lambda1, \ldots, b\lambda n$) of the imaging device used for image capturing; $E(\lambda)$ is the spectral energy distribution (estimated value) of the light source used for image capturing; $R(\lambda)$ is the spectral reflectance of the color-correction object; and i is the number of color types (number of colors).

(Math. 3)

$$\begin{bmatrix} R_i \\ G_i \\ B_i \end{bmatrix} = \quad (3)$$

$$S_k(\lambda)^T \cdot E(\lambda) \cdot R_i(\lambda) = \begin{bmatrix} r_{\lambda_1} & g_{\lambda_1} & b_{\lambda_1} \\ \vdots & \vdots & \vdots \\ r_{\lambda_n} & g_{\lambda_n} & b_{\lambda_n} \end{bmatrix}^T \cdot \begin{bmatrix} E_{\lambda_1} & \cdots & 0 \\ \vdots & \ddots & \vdots \\ 0 & \cdots & E_{\lambda_n} \end{bmatrix} \cdot \begin{bmatrix} R_{i\lambda_1} \\ \vdots \\ R_{i\lambda_n} \end{bmatrix}$$

The spectral image generation section 74 uses the spectral energy distribution of the light source estimated by the spectral energy distribution estimation section 73 and the spectral sensitivity characteristics of the imaging device, to estimate the spectral reflectance corresponding to each of the pixel values (RGB data) of pixels in the entire captured image or the region of the target T through metamer estimation (refer to Hasegawa, et al. "Object Color Prediction from an RGB Image Based on Metamer Estimation (Part I: Theory)". The Journal of the Institute of Image Electronics Engineers of Japan, vol. 38 (2009): pp. 365-374). The spectral-image generation section 74 is an example of a color-characteristic-information estimation section.

The spectral-image generation section 74 then estimates the spectral reflectance of each pixel in the entire captured image or the region of the target T, to generate spectral images (discrete spectral images) of a predetermined number of samples (a number of channels having a predetermined wavelength width) from the captured image (refer to JP 2006-060776 A).

Here, the spectral image is used for the color reproduction of the captured image under ambient light of an arbitrary light source by the spectral energy distribution of an arbitrary light source.

The reproduction-color-gamut determination section 75 determines a subspace (for example, a subspace in an RGB coordinate system) constituted by pixel values of pixels in a region of the color-correction object in the captured image. The reproduction-color-gamut determination section 75 then obtains the pixel values of the entire captured image or the region of the target T in the captured image, and calculates the reproduction color sufficiency percentage as the percentage of the pixel values in the subspace.

If the reproduction color sufficiency percentage obtained in the calculated result is lower than a predetermined sufficiency percentage threshold, the reproduction-color-gamut determination section 75 determines that the color of the image of the target T cannot be reproduced from the captured image.

The reproduction-color-gamut determination section 75 calculates an occupancy ratio of the reproduced color gamut (for example, the color gamut in an L*a*b* coordinate system) derived from the spectral reflectance obtained from the color-correction object in the standard color gamut (color space) such as sRGB or AdobeRGB, that is the color gamut coverage. Here, the reproduction-color-gamut determination section 75 converts the spectral reflectance corresponding to the color-correction object to a coordinate value in the color space of the L*a*b* coordinate system, which is a colorimetric value, by prescribing a reference light source (in this case, the determined spectral energy distribution) and a standard observer.

In this calculated result, if the color gamut coverage percentage is less than a predetermined coverage threshold, the reproduction-color-gamut determination unit 75 determines that the color of the image of the target T in the captured image cannot be reproduced with high accuracy from the spectral image.

Figure 10A:
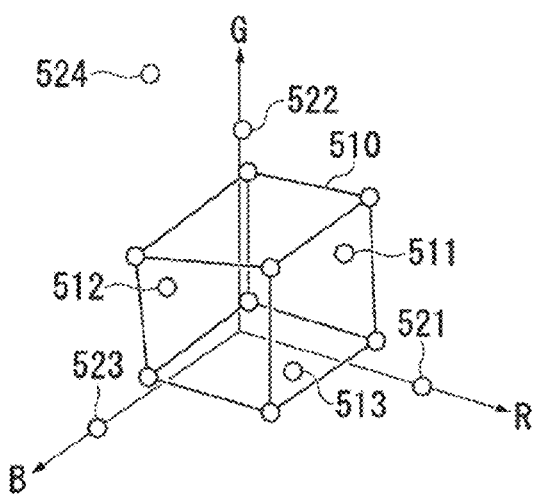
FIG. 10(a) and FIG. 10(b) is a conceptual diagram illustrating a reproduction color sufficiency percentage and a color gamut coverage percentage calculated by a reproduction-color-gamut determination section 75.
Figure 10B:
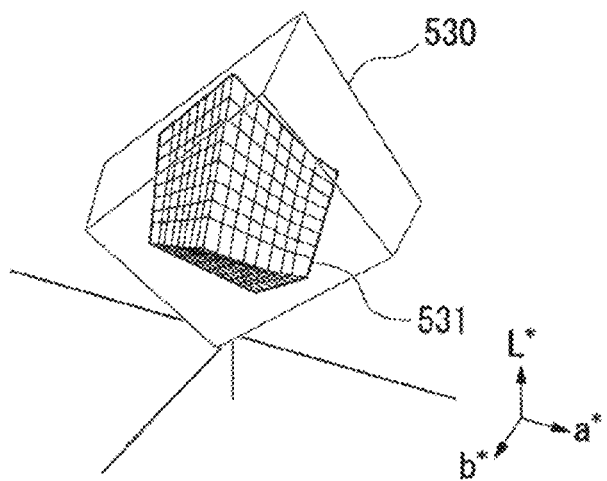

FIG. 10(a) and FIG. 10(b) is a conceptual diagram illustrating the reproduction color sufficiency percentage and the color gamut coverage percentage calculated by the reproduction-color-gamut determination section 75.

FIG. 10(a) is a diagram illustrating an RGB coordinate system of a three-dimensional space including a color component R axis, a color component G axis, and a color component B axis for explaining a reproduction color sufficiency percentage. FIG. 10(a) illustrates a subspace 510 generated by the reproduction-color-gamut determination section 75 in a three-dimensional shape.

Each of the reproduction color points 511, 512, and 513 indicates the coordinates of pixel values included in the subspace 510. Each of the reproduction color points 521, 522, 523, and 524 indicates the coordinates of pixel values not included in the subspace 510. In this case, since there are seven pixel values and three pixel values are included in the subspace 510, the reproduction color sufficiency percentage is 42.8% ((3/7)*100).

FIG. 10(*b*) illustrates an L*a*b* coordinate system for describing color gamut coverage percentage. All or a portion of the reproduction color gamut 531 is included in a standard color space 530. The color gamut coverage percentage indicates an occupancy ratio of the portion of the reproduction color gamut 531 included in the standard color space 530 relative to the volume of the color space 530. For example, if the volume of the color space 530 is 50 (in arbitrary unit), and the volume of the reproduction color gamut 531 included in the color space 530 is 30, the color gamut coverage percentage is 60% ((30/50)*100).

The display-image generation section 76 generates, from an arbitrary spectral image, a display image of the target T corresponding to the captured image with colors visually recognized under ambient light of an arbitrary light source using the spectral energy distribution of an arbitrary light source.

Here, the spectral energy distribution may be estimated by the spectral energy distribution estimation section 73 or previously stored in the storage section 77. The spectral image may be generated by the spectral-image generation section 74 or previously stored in the storage section 77.

The storage section 77 temporarily stores data, such as the captured image and the spectral image, to be processed by the image correction server 11A.

Figure 11:
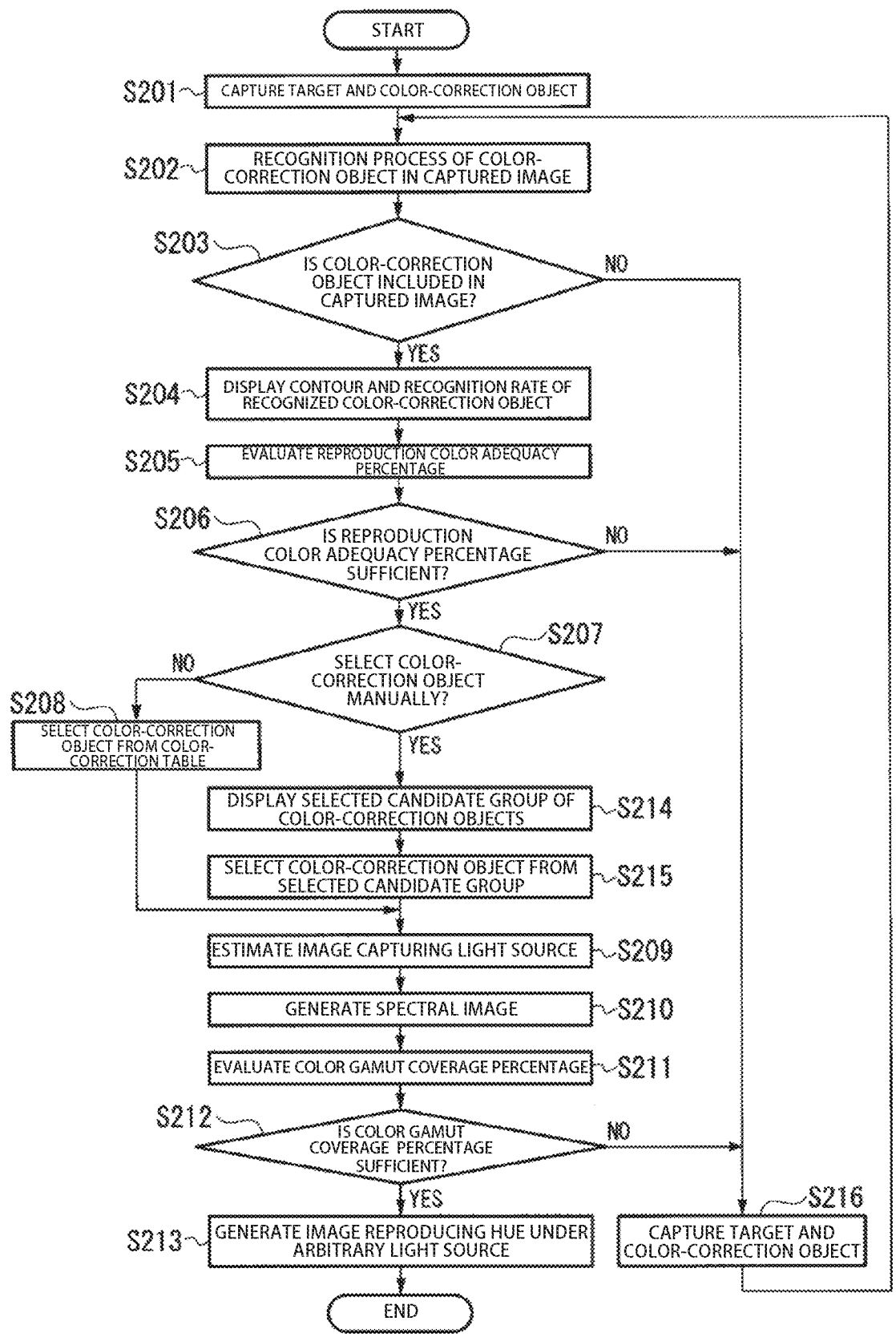
FIG. 11 is a flowchart of an operation example of the process for generating a spectral image of the captured image at the presenting side, performed by the color correspondence information generating system according to the present embodiment.

Next, FIG. 11 is a flowchart of an operation example of the process for generating a spectral image of the captured image at the presenting side, performed by the color correspondence information generating system according to the present embodiment. The process of generating a spectral image of a captured image on the presenting side, by the color correspondence information generating system will be explained with reference to FIGS. 6, 7, 8, and 11.

Step S201:

The user captures a captured image 20 with the imaging device 3-1, as illustrated in FIG. 9(*a*), and sends the captured image 20 from the user terminal device 2-1 to the image correction server 11A via the network 5.

Step S202:

The captured-image acquisition section 71 receives the captured image, and writes and stores the captured image 20 into the storage section 77.

The color-correction-object recognition section 72 performs contour extraction from each image in the captured image 20, and extracts an image within the contour. The color-correction-object recognition section 72 calculates the degrees of similarity by comparing the image with the template image or comparing each of the characteristic values.

Step S203:

The color correction object recognition section 72 determines whether the degrees of similarity of each extracted image is equal to or greater than a predetermined degrees of similarity threshold, that is, whether a color-correction object registered in the color-correction object table in the color-correction-object database 12 is included in the captured image 20.

At this time, if the degrees of similarity of any of the extracted images are equal to or greater than the predetermined degree of similarity threshold, the color-correction-object recognition section 72 determines that a color-correction object is included in the captured image 20 and advances the process to step S204. If the degrees of similarity of all the extracted images are smaller than the predetermined degree of similarity threshold, the color-correction-object recognition section 72 determines that a color-correction object is not included in the captured image 20 and advances the process to step S216.

Step S204:

The color-correction-object recognition section 72 sends the image of the color-correction objects included in the captured image 20 and data of the contours of the recognized images (31 and 41), to the user terminal device 2-1.

As illustrated in FIG. 9(*b*), the user terminal device 2-1 marks contours of the images (31 and 41), corresponding to the received data of the contours, with lines having a predetermined thickness and displays the degrees of similarity (171 and 181) near the recognized images on the display screen 21 of the display device 4-1.

Step S205:

The reproduction-color-gamut determination section 75 determines a subspace constituted by pixel values of pixels in a region of a color-correction object in the captured image 20. The reproduction-color-gamut determination section 75 then calculates the reproduction color sufficiency percentage which is the ratio of the pixel value of each pixel in the entire captured image 20 or the region of the target T, included in the subspace.

When a plurality of color-correction objects are imaged in the captured image 20, the reproduction-color-gamut determination section 75 may calculate the reproduction color sufficiency percentage based on a space obtained by synthesizing subspaces each of which is constituted by pixel values of pixels in a region of each of a plurality of color-correction objects in the captured image 20.

Step S206:

The reproduction-color-gamut determination section 75 then determines whether the determined reproduction color sufficiency percentage is equal to or greater than a predetermined sufficiency percentage threshold, that is, whether the reproduction color gamut has a sufficient range for the reproduction of the colors of the pixels in the captured image 20.

At this time, if the reproduction color sufficiency percentage is equal to or greater than the predetermined sufficiency percentage threshold, and the range of the reproduction color gamut is sufficient for reproducing colors, the reproduction-color-gamut determination section 75 advances the process to step S207. If the reproduction color sufficiency percentage is smaller than the predetermined sufficiency percentage threshold, and the range of the reproduction color gamut is insufficient for reproducing colors, the reproduction-color-gamut determination section 75 sends acceptability determination information indicating that the reproduction color gamut is insufficient to the user terminal device 2-1 and advances the process to step S216.

Step S207:

When there are a plurality of color-correction objects having template images of the color correction objects or characteristic values, in which the degrees of similarity of the extracted images are within the predetermined numerical range, the color-correction-object recognition section 72 displays the color-correction objects having degrees of similarity within the predetermined numerical range on the display screen 21 of the display device 4-1 and allows the user to decide whether to manually select a color-correction object.

At this time, if the user decides not to manually select a color-correction object, the color-correction-object recognition section 72 advances the process to step S208. If the user decides to manually select a color-correction object, the color-correction-object recognition section 72 advances the process to step S214.

Step S208:

The color-correction-object recognition section 72 extracts each color-correction object having the highest similarity to the image from a color correction table for each image of the color correction object in the captured image 20.

Step S209:

The spectral energy distribution estimation section 73 refers to the color-correction-object database 12 and reads the spectral reflectances of the color-correction objects extracted by the color correction object recognition section 72, from the color-correction table. The spectral energy distribution estimation section 73 refers to the spectral sensitivity characteristic database 13 and reads the spectral sensitivity characteristics of the imaging device 3-1.

The spectral energy distribution estimation section 73 then uses the formula (3) described above to calculate the spectral energy distribution of the first light source 701 in the environment in which the captured image 20 is captured, from the spectral sensitivity characteristics of the imaging device 3-1 and the spectral reflectances of the color-correction objects through multiple regression analysis or the like, so that the pixel values of the captured image 20 become a solution.

Step S210:

A spectral image generation section 74 uses the spectral energy distribution estimated by the spectral energy distribution estimation section 73 and the spectral sensitivity characteristics of the imaging device 3-1, to estimate the spectral reflectance corresponding to each of the pixel values of pixels included in the entire captured image 20 or the region of the target T. The spectral-image generation section 74 then generates a spectral image 200 for each channel having a predetermined wavelength width from the captured image 20 in accordance with the obtained spectral reflectance for each pixel.

Step S211:

The reproduction-color-gamut determination section 75 calculates the color gamut coverage percentage being an occupancy ratio of the reproduction color gamut relative to a standard color space.

Step S212:

The reproduction-color-gamut determination section 75 then determines whether the determined color gamut coverage percentage is equal to or greater than a predetermined color gamut coverage percentage threshold, that is, whether the reproduction color gamut has a sufficient range for the reproduction of the color of each pixel in the captured image 20.

At this time, if the color gamut coverage percentage is equal to or greater than a predetermined color gamut coverage percentage threshold, the reproduction-color-gamut determination section 75 advances the process to step S213. If the color gamut coverage percentage is lower than the predetermined sufficiency percentage threshold, the reproduction-color-gamut determination section 75 sends acceptability determination information indicating that the color gamut coverage percentage is insufficient to the user terminal device 2-1, and advances the process to step S216.

Step S213:

The display-image generation section 76 generates a display image of the captured image 20 in colors visually recognized under ambient light of the first light source 701 (color information under an environment of the first light source 701) by the spectral image (color characteristic information), and the spectral energy distribution of the first light source 701 (color correspondence information).

The display-image generation section 76 then sends the generated display image to the user terminal device 2-1.

The first light source 701 is an example of a light source. The display-image generation section 76 is an example of a color-information estimation section.

The user terminal device 2-1 displays the received display image on the display screen 21 of the display device 4-1. In this way, the user can observe the captured image 20 obtained by capturing the target T under ambient light of the first light source 701 and visually observe both the actual target T and the image TG of the target T on the display screen 21 of the display device 4-1, to determine whether the colors are the same.

Step S214:

As shown in FIG. 9(f), the color-correction-object recognition section 72 prompts the user to select which of the candidate images of color-correction objects corresponding to each of the images 31 and 41 are to be displayed.

The color-correction-object recognition section 72 then displays each of images 31_1, 31_2, and 31_3 of a plurality of color-correction objects having a predetermined range of the degree of similarity to the image 31 of the selected color-correction object as candidates (candidate group) of the color-correction object, on the display screen 21 of the display device 4-1 of the user terminal device 2-1, as illustrated in FIG. 9(g). Here, the color-correction-object recognition section 72 generates thumbnail images one-to-one corresponding to each of the candidates, and sends the thumbnail images and the degrees of similarity of the respective candidates calculated by the color-correction-object recognition section 72 to the user terminal device 2-1.

Then, the user terminal device 2-1 displays each of the received thumbnail images and the degrees of similarity of the candidates corresponding to the respective thumbnail images in combination on the display screen 21 of the display device 4-1.

Step S215:

When the user selects an image of a color-correction object from the candidates, the user terminal device 2-1 sends information showing the thumbnail image selected by the user, that is, designated information indicating which of a plurality of thumbnail image candidates has been designated, to the color-correction-object recognition section 72.

When the designated information indicating the thumbnail image selected by the user is sent from the user terminal device 2-1, the color-correction-object recognition section 72 displays images of the candidates of another type of color-correction object on the display screen 21 of the display device 4-1, sequentially selects the color-correction objects in the captured image 20, and extracts the spectral reflectance.

Note that, in the configuration described above, a character string (for example, product name) having a one-to-one correspondence with the color-correction object may be used in place of a thumbnail image.

Step S216:

If the color-correction object is not included in the captured image 20 or if the reproduction color sufficiency percentage (and the color gamut coverage percentage) is lower than a predetermined threshold, the color-correction-object recognition section 72 sends information (acceptability determination information indicating unacceptability) to the user terminal device 2-1 indicating to the user that the captured image 20 cannot be used for the generation of color correspondence information at this time.

When the user terminal device 2-1 receives the acceptability determination information indicating unacceptability from the color-correction-object recognition section 72, the user terminal device 2-1 displays a display prompting the addition of another type of color-correction object on the display screen 21 of the display device 4-1, and notifies the user about the addition of another type of color-correction object.

In response to this, the user adds another type of color-correction object in addition to the color-correction object imaged together with the target T at this time.

If the color correction object recognition section 72 cannot retrieve an image having a degree of similarity within a predetermined range of both the images 31 and 41 of the color-correction objects from the color-correction-object database 12, the color correction object recognition section 72 may send the highest degree of similarity not included in the predetermined range and the information of unacceptability to the user terminal device 4-1.

The user terminal device 2-1 then displays the degrees of similarity on the display screen 21 of the display device 4-1. Here, the user refers to the degrees of similarity on the display device 4-1, determines whether the image can be used for color correction, and sends the determination result from the user terminal device 2-1 to the color correspondence information generating system 1A.

Figure 12:
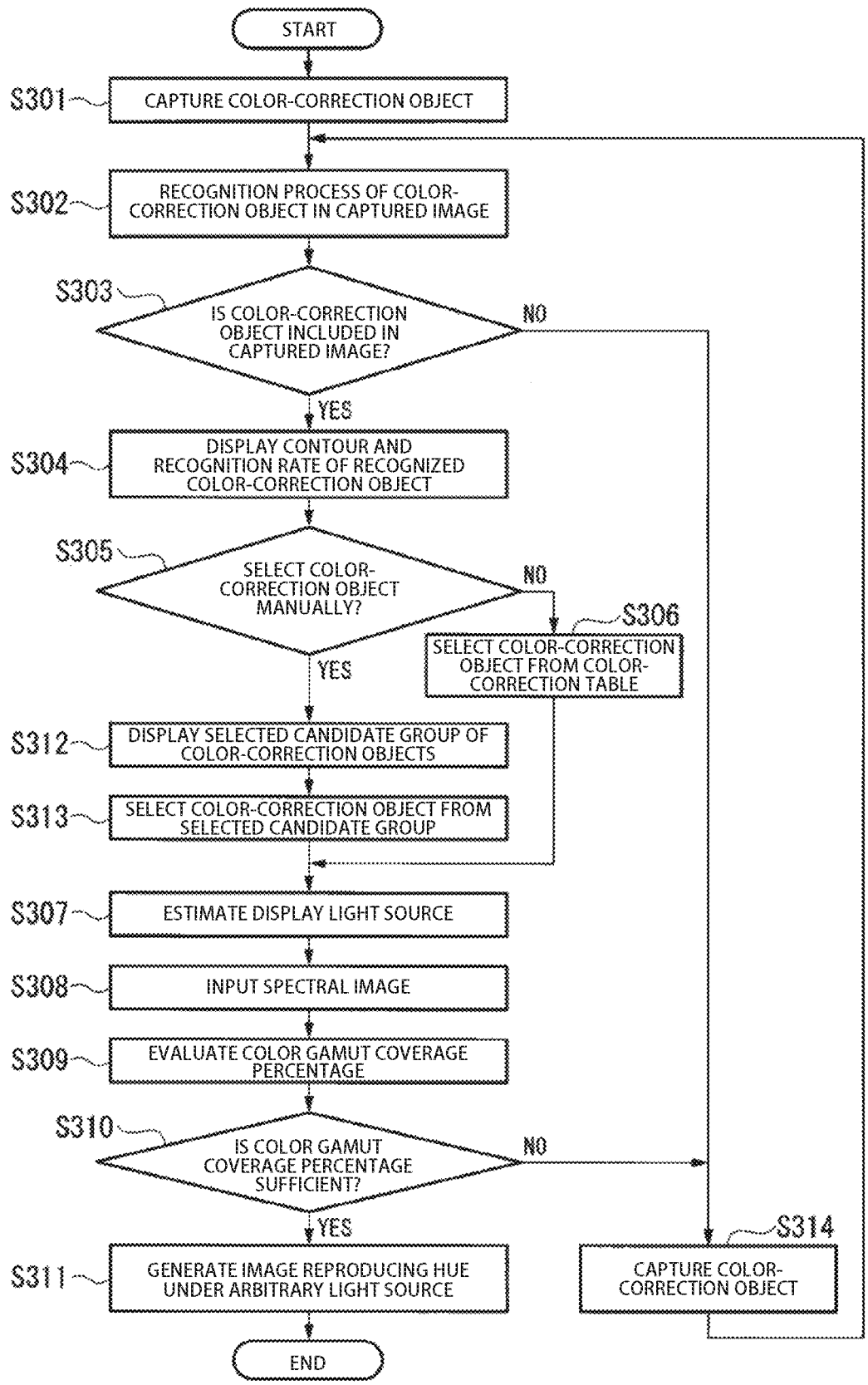
FIG. 12 is a flowchart of an operation example of the process for generating a display image from a spectral image on the displaying side, performed by the color correspondence information generating system according to the present embodiment.

FIG. 12 is a flowchart of an operation example of the process for generating a display image from a spectral image on the displaying side, performed by the color correspondence information generating system according to the present embodiment. The process of generating a display image on the displaying side by the color correspondence information generating system will be explained with reference to FIGS. 7, 8, and 12.

The process of generating a display image on the displaying side by the color correspondence information generation system will be described with reference to the drawings.

In the explanation of the following process for selecting a color-correction object, the user terminal device 2-1, the imaging device 3-1, and the display device 4-1 are respectively replaced by a user terminal device 2-2, an imaging device 3-2, and a display device 4-2. Steps S302, S303, S304 to S306, S310, S312, and steps S313 are the same as steps S202, S203, S204 to S206, S210, S212, and S213 in the flowchart shown in FIG. 11. Therefore, descriptions thereof are omitted. The image on the display device 4-2 of the user on the displaying side does not include an image of the target T. The flowchart in FIG. 12 does not include steps for generating and determining the reproduction color sufficiency percentage, which correspond to steps S205 and S206 in the flowchart in FIG. 11.

Step S301:
The user captures a color-correction object under ambient light of a second light source 702 with the imaging device 3-2, and sends the captured image from the user terminal device 2-2 to the image correction server 11A via the network 5.

Step S307:
The spectral energy distribution estimation section 73 refers to the color-correction-object database 12 and reads the spectral reflectance of the color-correction object extracted by the color correction object recognition section 72, from the color-correction table.

The spectral energy distribution estimation section 73 calculates the spectral energy distribution of the second light source 702 in the environment in which the captured image is captured, by multiple regression analysis or the like, from the spectral sensitivity characteristics of the imaging device 3-2 and the spectral reflectance of the color-correction object, using the above formula (3) so that the pixel values of the captured image become a solution.

Step S308:
The user accesses the image correction server 11A with the user terminal device 2-2 and instructs the selection of a spectral image.

In response, the captured-image acquisition section 71 reads, from the storage section 77, the spectral image requested by the user terminal device 2-2.

Step S309:
The reproduction-color-gamut determination section 75 calculates the color gamut coverage percentage being an occupancy ratio of the reproduction color gamut relative to a standard color space.

Step S311:
The display-image generation section 76 generates a display image of the captured image of the target T with colors visually recognized under ambient light of the second light source 702. The generation is performed using the spectral image supplied from the image correction server 11A and the spectral energy distribution of the second light source 702 estimated by the spectral energy distribution estimation section 73. The display-image generation section 76 then sends the generated display image to the user terminal device 2-2.

The user terminal device 2-2 displays the received display image on the display screen 21 of the display device 4-2. In this way, the user can observe the colors of the actual target T visually recognized under ambient light of the second light source 702, in an image TG of the target T on the display screen 21 of the display device 4-2.

The spectral image used for the generation of the image TG may be a spectral image previously obtained through a known method and not a spectral image (second color characteristic information) generated in accordance with the flowchart in FIG. 11. For example, the color characteristic information of the target T may be previously written and stored in a predetermined storage, such as a product database, in the storage section 77. In such an example, for example, the color characteristic information of the target T as a product that has already been on sale is written and stored in the product database in the storage section 77.

Then, the display-image generation section 76 may use, for example, the spectral energy distribution (color correspondence information) of the second light source 702 determined as described above and color characteristic information of the target T stored in the product database in the storage section 77, to generate a display image in which the target T can be observed with colors visually recognized under an environment of the second light source 702 or an arbitrary light source, as described above.

Step S314:
The color-correction-object recognition section 72 sends information (acceptability determination information indicating unacceptability) to the user terminal device 2-2 indicating to the user that the captured image 20 cannot be used for the generation of color correspondence information at this time.

When the user terminal device 2-2 receives the acceptability determination information indicating unacceptability from the color-correction-object recognition section 72, the user terminal device 2-2 displays a display prompting the addition of another type of color-correction object on the display screen 21 of the display device 4-2, and notifies the user about the addition of another type of color-correction object.

In response to this, the user adds another type of color-correction object in addition to the color-correction object imaged together with the target T at this time.

The color-correction-object recognition section 72 generates thumbnail images one-to-one corresponding to the respective candidates, sends the thumbnail images to the user terminal device 2-2, and causes the thumbnail images to be displayed on the display screen 21 of the display device 4-2 of the user terminal device 2-2 together with the calculated degrees of similarity.

If the color correction object recognition section 72 cannot retrieve an image having a degree of similarity within a predetermined range of both the images 31 and 41 of the color-correction objects from the color-correction-object database 12, the color correction object recognition section 72 may send the highest degree of similarity not included in the predetermined range and the information of unacceptability to the user terminal device 2-2.

The user terminal device 2-2 then displays the degrees of similarity on the display screen 21 of the display device 4-2. Here, the user refers to the degrees of similarity on the display device 4-2, determines whether the image can be used for color correction, and sends the determination result from the user terminal device 2-2 to the color correspondence information generating system 1A.

Figure 13:
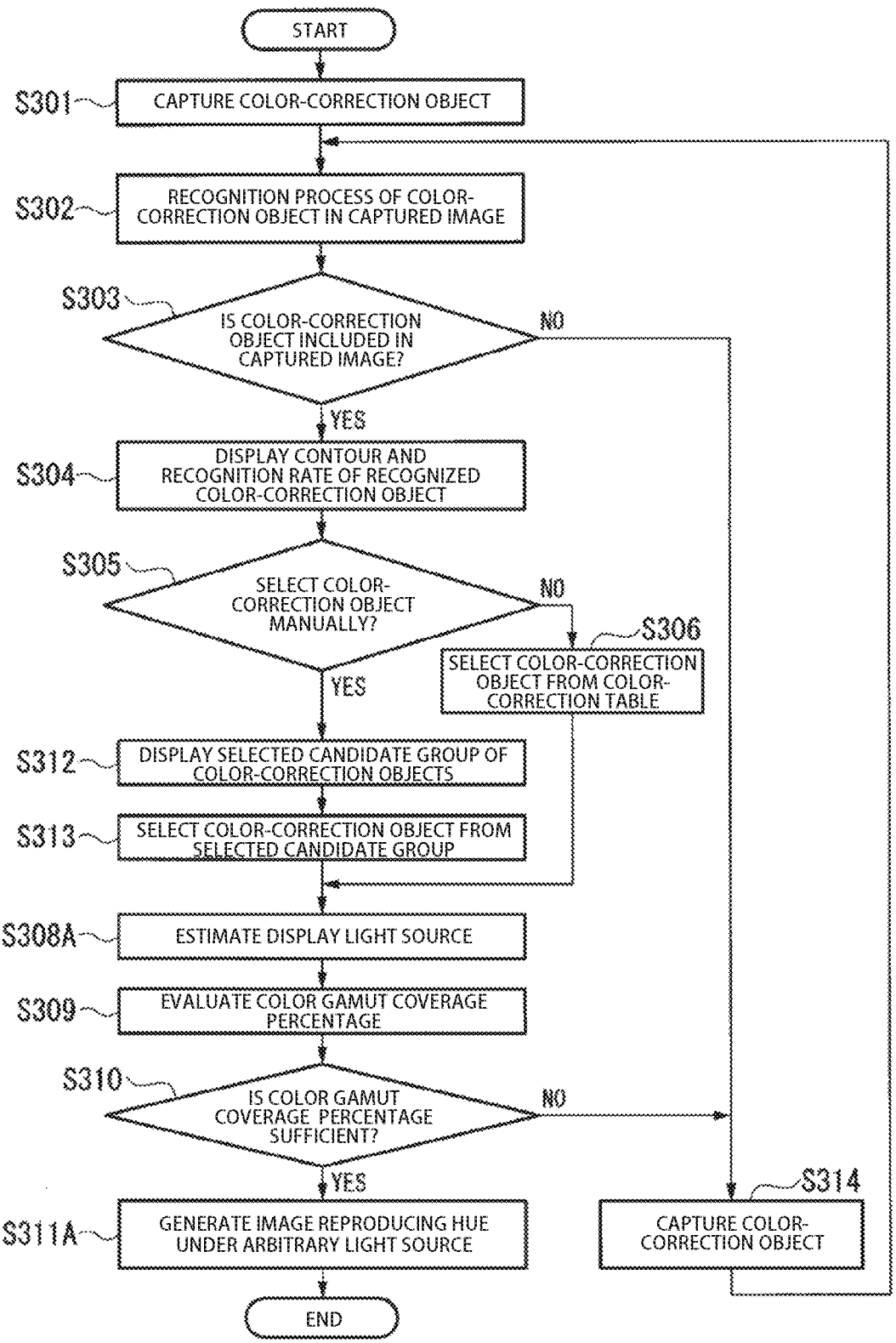
FIG. 13 is a flowchart of an operation example of the process for generating a display image from a standard RGB image of a target at the displaying side, by the color correspondence information generating system according to the present embodiment.
Figure 14:
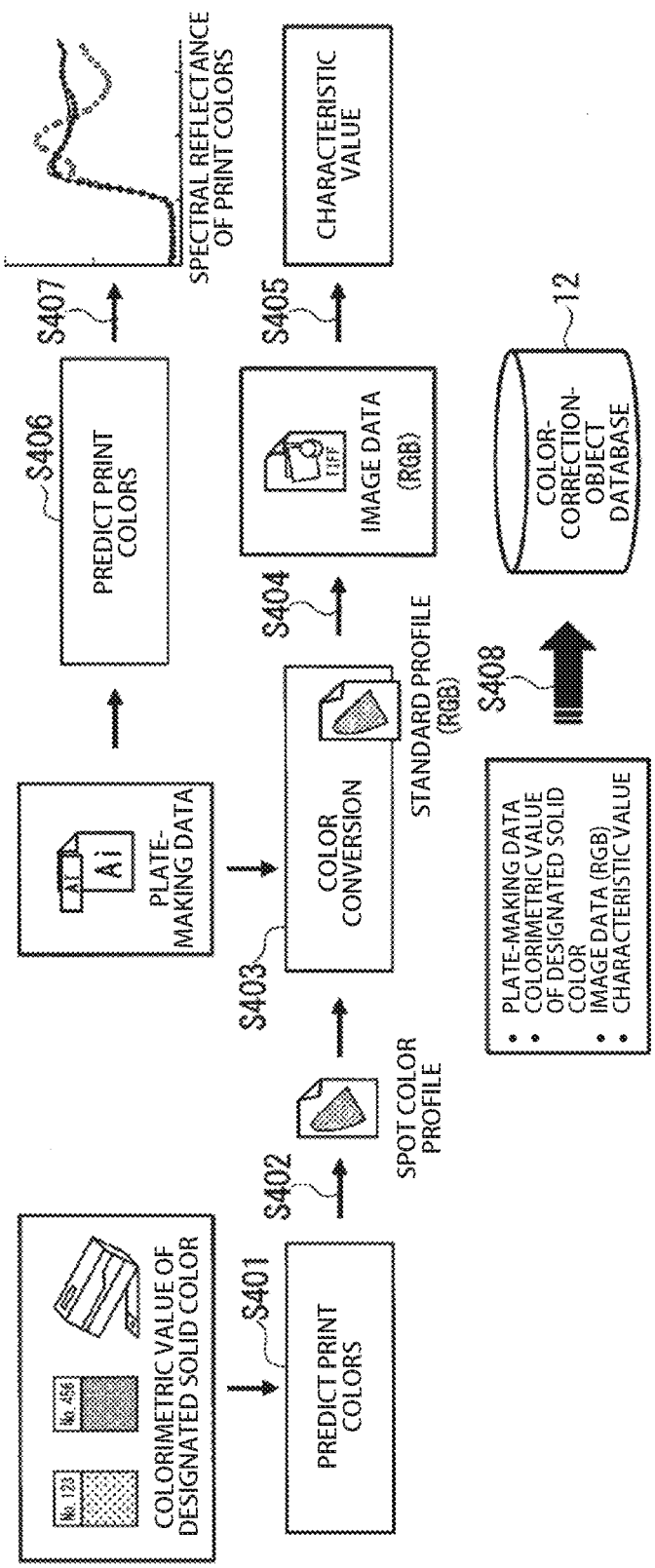
FIG. 14 is a conceptual diagram illustrating a method of estimating spectral reflectance from a color-correction table in a color-correction-object database 12.

FIG. 13 is a flowchart of an operation example of the process for generating a display image from a standard RGB image of a target at the displaying side, by the color correspondence information generating system according to the first embodiment. Referring to FIGS. 1, 3, and 13, another example of the process for generating a display image on the displaying side by the color correspondence information generating system will be described below. In the process of the flowchart in FIG. 12, a display image is generated from a spectral image. In FIG. 13, a display image is generated from a standard RGB image, using a color-correction matrix N.

Steps S301 to S306, S309 to S310, and S312 to S314 in the flowchart of FIG. 13 are the same as those in the flowchart of FIG. 12. Therefore, descriptions thereof are omitted. The processes in steps S308A to S311A will now be described.

Step S308A:

The color-correction-matrix calculation section 63 generates a color-correction matrix N that converts a standard RGB image of colors visually recognized under an environment of a reference light source to a display RGB image of the colors visually recognized under an environment of an arbitrary second light source 702, in a manner similar to the generation of the color-correction matrix N described in formulas (1) and (2). Here, the color-correction-matrix calculation section 63 generates the color-correction matrix N by performing, for example, multiple regression analysis so that the pixel values of the reference RGB image becomes a solution of the pixel values of pixels of the standard RGB image.

Step S311A:

The display-image generation section 76 generates a display image of the target T with colors visually recognized under ambient light of the second light source 702. The generation is performed using the standard RGB image supplied from the image correction server 11A and a color-conversion matrix N generated by the color-correction-matrix calculation section 63. The display-image generation section 76 then sends the generated display image to the user terminal device 2-2.

The user terminal device 2-2 displays the received display image on the display screen 21 of the display device 4-2. As in the process of the flowchart of FIG. 12, the user can observe the color of viewing the actual target T under the ambient light of the second light source 702 on the image TG of the target T on the display screen 21 of the display device 4-2.

Note that, more precisely, to generate a display image, it is necessary that the correspondence relation is known between pixel values when the colorimetric value of the target to be captured matches the colorimetric value of the display image under the image capturing condition (sensitivity characteristics, etc. of the camera) of the captured image 20 and the display condition (display characteristics, etc., of the display). At this time, the display image is generated by converting pixel values of pixels in the standard RGB image of the target T with the color-conversion matrix N and further converting the pixel values based on the correspondence relation.

As described in the first and second embodiments above, the package or wrapping of a commercially available product can be used in place of a color chart, and the spectral reflectance (estimated spectral reflectance) of the color-correction object previously stored in the color-correction-object database 12 is used, to estimate the spectral energy distribution of the light source at the time of image capture. Therefore, it is possible to readily generate a spectral image of the target and reproduce the colors visually recognized under ambient light of an arbitrary light source.

Therefore, according to the present embodiment, an image of a target can be readily displayed on a screen with a color appearance close to the actual colors under ambient light of an arbitrary light source, without requiring the user to have a designated chart, without depending on ambient light of the light source at the time of image capture or the characteristics of the imaging device, and without having a special measuring device for measuring the spectral energy distribution.

According to the first and second embodiments, it is possible to observe a display image reproduced in colors that can be visually recognized under ambient light of a light source at the displaying side of an image of the product even if a captured image of a target which is a product is captured under any light source on the presenting side when purchasing the product by mail order or the like using the Internet. Therefore, according to the present embodiment, after the purchased product arrives, a color of the product visible under the ambient light of a predetermined light source is the same as the color of the display image. That is, the color visually recognized at the time of purchase and the color of the actual delivered product are the same. This reduces problems such as complaints that the delivered product differs in color from the purchased product.

The method of estimating spectral reflectance from the color-correction table of the color-correction-object database 12 will now be described. FIG. 13 is a conceptual diagram illustrating a method of estimating spectral reflectance from a color-correction table of the color-correction-object database 12. The estimation process of the spectral reflectance of a color-correction object described below (for details on an estimation process of spectral reflectance, refer to JP 2015-091116 A, for example) is performed by a spectral-reflectance estimation section (not illustrated). The spectral-reflectance estimation section may be included in the image correction server 11A or may be communicably connected to the network 5 as an independent server. The spectral-reflectance estimation section writes and stores the generated spectral reflectance in the color-correction table in the color-correction-object database 12.

Step S401:

A primary color or spot color ink of a designated solid color is printed on a predetermined medium (for example, coated paper).

The spectral-reflectance estimation section measures the colorimetric value (absorption coefficient and scattering coefficient) of the printed colored layer and calculates the spectral reflectance for each density gradation from the spectral reflectance corresponding to the film thickness of the primary color or spot color ink.

The spectral-reflectance estimation section performs color prediction corresponding to the superposition of inks in each density gradation region according to the film thickness of each ink.

Step S402:

The spectral-reflectance estimation section creates a spot color profile for predicting a print color corresponding to the color to be superimposed, the density of the ink to be printed, and the order thereof.

Steps S403 and S404:

The spectral-reflectance estimation section generates an image in which the color printed by plate-making data indicated by RGB data based on the plate-making data for printing ink on a color-correction object, the spot color profile, and a reference profile.

The reference profile is an International Color Consortium (ICC) profile for a standard RGB coordinate system, such as sRGB or AdobeRGB.

Step S405:

The spectral-reflectance estimation section performs a generation process of object recognition information, such as generation of a template image of the color-correction object from a generated display image or extraction of characteristic values, e.g. shape or color, of an image of the color-correction object from the display image.

Steps S406 and S407:

The spectral-reflectance estimation section predicts the print color of the ink to be printed in a sequential order according to the plate-making data, as in step S401, and calculates, as estimated spectral reflectance, the spectral reflectance of each portion of the colored layer including a plurality of ink layers resulting from the printing, from the spectral reflectance corresponding to the density gradation of the inks and the spectral reflectance of the base layer (a print medium or an ink layer) on which the inks are printed.

Step S408:

The spectral-reflectance estimation section writes the estimated spectral reflectance of the color-correction object in the color-correction-object database 12 together with image data and characteristic values.

In the case where the image correction server 11A includes a spectral-reflectance estimation section, the spectral-reflectance estimation section may write not the estimated spectral reflectance but the plate-making data and the colorimetric value of the designated solid color, as spectral reflectance information, and calculate the spectral reflectance for each process of selecting a color-correction object.

In general, it is easy to measure the spectral reflectance from a captured image when the print color of the color-correction object is a single color. However, it is difficult to measure all of the combinations of single colors, or the mixtures, or the gradations in the areas where the colors change, for example in a package or wrapping.

Therefore, in the present embodiment, in the case where spectral energy distribution for this case is estimated, it is preferable to have many types of colors of which the spectral reflectances are known so as to increase estimation accuracy of the spectral energy distribution. By estimating the spectral reflectance, the spectral reflectances at all portions of the color-correction object can be obtained. Therefore, the spectral energy distribution can be readily obtained with high accuracy, and a spectral image having higher accuracy can be generated.

A program to achieve the functions of each of the image correction servers 11 and 11A (the image correction server 11 in FIG. 3 and the image correction server 11A in FIG. 8) and each of the user terminal devices 2-1 and 2-2 of the present invention may be recorded on a computer readable storage medium to cause a computer system to read and execute the program recorded on the storage medium and perform color correction process in which a captured image is converted to a display image. Note that, the "computer system" herein includes an OS and hardware such as peripheral devices.

The "computer system" also includes a WWW system provided with a homepage providing environment (or display environment). The "computer-readable recording medium" refers to a storage device such as a portable medium, e.g., a flexible disk, a magneto-optical disk, a ROM, a CD-ROM or the like, or a hard disk incorporated in a computer system. The "computer-readable recording medium" also includes those that hold a program for a certain period of time, such as a volatile memory (RAM) in a computer system that serves as a server or a client in the case where the program is transmitted via a network such as the Internet or a communication line such as a telephone line.

Furthermore, the above program may be transmitted from a computer system that stores the program in a storage device or the like to another computer system via a transmission medium or transmission waves in a transmission medium. The "transmission medium" that transmits the program refers to a medium having a function of transmitting information, including a network (communication network) such as the Internet, and a communication circuit (communication line) such as a telephone line. The program described above may be one for realizing a part of the functions described above. Furthermore, the above functions may be realized by a combination with a program already recorded in the computer system, that is, a so-called differential file (differential program).

In JP 2002-152768, when the subject and the designated chart are imaged together, the designated chart must be available at the time of image capture. Therefore, the user has to take time and effort to acquire the designated chart.

When an image captured under an ambient light of an arbitrary light source is to be displayed in colors visually observed under ambient light of a different light source, spectral energy distribution of the light source in the environment in which the captured target is actually observed is required. However, not all users have a measuring device for measuring spectral energy distribution of a light source.

The present invention, which has been made under such circumstances, provides a color correspondence information generating system, a program, and a method of generating color correspondence information which provide a screen display that is close to the appearance of actual colors of an object visible under ambient light of a predetermined light source, without requiring a user to possess a designated chart, without depending on ambient light of the light source at the time of image capture or characteristics of an imaging device (imaging device), and without the need of a special measuring device for measuring spectral energy distribution of a light source.

A first aspect of the present invention is a color correspondence information generating system which generates color correspondence information indicating a correspondence relation between color information and color characteristic information using a first image obtained by capturing first objects under an environment of a light source. The color characteristic information indicating a characteristic of color represented by the color information, the system includes an object database that stores therein correspondences between recognition information which recognize the respective first objects and the color characteristic information about the first objects recognized by the recognition information; an object recognition section that recognizes the first objects in the first image from the first image and the recognition information, and outputs image regions of the first objects in the first image and first color characteristic information, the first color characteristic information being the color characteristic information corresponding to the first objects; and a color correspondence information generation section that generates the color correspondence information which is a correspondence relation between the color information and the color characteristic information, using the color information and the first color characteristic information of pixels in the image regions. The color characteristic information and the recognition information have a one-to-one correspondence relation with each other, or the color characteristic information being the recognition information itself.

A second aspect of the present invention is the color correspondence information generating system according to the first aspect in which at least one of the predetermined plurality of first objects is an object different from a color chart.

A third aspect of the present invention is the color correspondence information generating system according to the second aspect in which the object different from the color chart is an object having a plurality of colors including a product available to a general user, and a package and a container of the product.

A fourth aspect of the present invention is the color correspondence information generating system according to any one of the first to third aspects further including a color-characteristic-information estimation section which estimates second color characteristic information from the first image or a second image, and the color correspondence information, the second color characteristic information being color characteristic information of a second object different from the first objects, the first image obtained by capturing the first objects and the second object in a same image, the second image being an image of the second object captured under same light source as the first object captured in the first image.

A fifth aspect of the present invention is the color correspondence information generating system according to the fourth aspect further including a reproduction-color-gamut determination section which generates a reproduction color sufficiency percentage being a ratio of pixel values of pixels in a region corresponding to the second object in the first image or the second image, included in a subspace of an RGB space constituted by pixel values of pixels in regions corresponding to the first objects in the first image.

A sixth aspect of the present invention is the color correspondence information generating system according to any one of the first to third aspects further including a color-information estimation section that estimates color information of another object different from the first objects in an environment of the light source, using the color correspondence information and the color characteristic information of the another object.

A seventh aspect of the present invention is the color correspondence information generating system according to any one the first to sixth aspects in which the color characteristic information is reference color information which is color information of one or a plurality of the first objects captured in an environment of a standard light source, and the color correspondence information is a color-correction matrix for performing color conversion.

An eighth aspect of the invention is the color correspondence information generating system according to any one the first to sixth aspects further including a spectral sensitivity characteristic database storing spectral sensitivity characteristics of an imaging device used for capturing the first image. The color characteristic information is spectral reflectance of one or a plurality of the first objects. The color correspondence information is a combination of spectral energy distribution of the light source and the spectral sensitivity characteristics.

A ninth aspect of the present invention is the color correspondence information generating system according to any one of the first to eighth aspects in which the color correspondence information generating system is connected to a user terminal device owned by a user via a network, and sends and receives data to and from the user terminal device via the network, the data received from the user terminal device includes the first image, and data sent to the user terminal device includes acceptability determination information indicating whether the first image is acceptable for use.

A tenth aspect of the present invention is the color correspondence information generating system according to the ninth aspect in which the object recognition section calculates degrees of similarity between the first objects and pieces of recognition information of each object registered in the object database, and generates thumbnail images one-to-one corresponding to each of a plurality of pieces of recognition information of which the degrees of similarity satisfy a predetermined condition, data sent to the user terminal device includes the degrees of similarity and thumbnail images, data received from the user terminal device includes designated information indicating which of the thumbnail images has been selected, and the object recognition section selects an object of the recognition information corresponding to the designated information.

An eleventh aspect of the present invention is the color correspondence information generating system according to the tenth aspect in which data sent to the user terminal device includes image region information which is information indicating the image region.

A twelfth aspect of the present invention is the color correspondence information generating system according to the seventh aspect in which the color correspondence information generating system is connected to a user terminal device owned by a user via a network, and sends and receives data to and from the user terminal device via the network, the data received from the user terminal device includes the first image, data sent to the user terminal device includes acceptability determination information indicating whether the first image is acceptable for use, and the reproduction-color-gamut determination section sets information indicating unacceptability in the acceptability determination information when the reproduction color sufficiency percentage is lower than a predetermined threshold.

A thirteenth aspect of the present invention is the color correspondence information generating system according to the fifth aspect in which the color correspondence information generating system is connected to a user terminal device owned by a user via a network, and sends and receives data to and from the user terminal device via the network, the data received from the user terminal device includes the first image, and data sent to the user terminal device includes the reproduction color sufficiency percentage.

A fourteenth aspect of the present invention is the color correspondence information generating system according to the ninth aspect further including a reproduction-color-gamut determination section which converts the first color characteristic information, after being made to correspond to a predetermined condition, to first color information which is the color information, generates coverage percentage, and determines whether the coverage percentage is lower than a predetermined threshold, the coverage percentage being a ratio of a color gamut reproducible by the first color information relative to a predetermined standard color gamut. The reproduction-color-gamut determination section adds information indicating unacceptability to the acceptability determination information when the coverage percentage is lower than a predetermined threshold.

A fifteenth aspect of the present invention is the color correspondence information generating system according to the ninth aspect further including a reproduction-color-gamut determination section which converts the first color characteristic information, after being made to correspond to a predetermined condition, to first color information and generates coverage percentage which is a ratio of a color gamut reproducible by the first color information relative to a predetermined standard color gamut, wherein data sent to the user terminal device includes the coverage percentage.

A sixteenth aspect of the present invention is a program that causes a computer to function as a user terminal device connected to the color correspondence information generating system according to any one of ninth, twelfth, and fourteenth aspects in the color correspondence information generating system according to the ninth aspect described above. The program causing the computer to execute a step of sending the first image to the color correspondence information generating system; and a step of receiving the acceptability determination information from the color correspondence information generating system.

A seventeenth aspect of the invention is the program according to the sixteenth aspect that causes the computer to execute a step of prompting a user to image another object different from the first objects in the first image when the acceptability determination information indicates unacceptability.

An eighteenth aspect of the present invention is a program that causes a computer to function as a user terminal device connected to the color correspondence information generating system according to the tenth aspect, the program causing the computer to execute a step of receiving, from the color correspondence information generating system, thumbnail images of images of candidate objects similar to the first objects, and information on degrees of similarity between the candidate objects and the first objects; a step of presenting, to a user, the thumbnail images and degrees of similarity of the candidate objects corresponding to the thumbnail images; and a step of sending designated information indicating which of the candidate objects has been selected to the color correspondence information generating system.

A nineteenth aspect of the present invention is a program that causes a computer to function as a user terminal device connected to the color correspondence information generating system according to the eleventh aspect, the program causing the computer to execute a step of receiving the image region of the first objects from the color correspondence information generating system; and a step of marking a range indicated by the image region in the first image and presenting the marked image region to a user.

A twentieth aspect of the present invention is a program that causes a computer to function as a user terminal device connected to the color correspondence information generating system according to the thirteenth aspect, the program causing the computer to execute a step of receiving the reproduction color sufficiency percentage from the color correspondence information generating system and a step of presenting the reproduction color sufficiency percentage to a user.

A twenty-first aspect of the present invention is a program that causes a computer to function as a user terminal connected to the color correspondence information generating system according to the fifteenth aspect, the program causing the computer to execute a step of receiving the coverage percentage from the color correspondence information generating system; and a step of presenting the coverage percentage to a user.

A twenty-second aspect of the invention is a method of generating color correspondence information using the color correspondence information generating system according to the ninth aspect and a user terminal device owned by a user. The method includes sending and receiving data to and from the user terminal device via a network, the color correspondence information generating system being connected to the user terminal device via the network, the data received by the color correspondence information generating system from the user terminal device includes the first image, data sent from the color correspondence information generating system to the user terminal device including one of acceptability determination information, a reproduction color sufficiency percentage, and coverage percentage, the acceptability determination information indicating whether the first image is acceptable for use, the reproduction color sufficiency percentage being a ratio of pixel values of pixels in a region corresponding to the second object in the first image or the second image, included in a subspace of an RGB space constituted by pixel values of pixels in regions corresponding to the first objects in the first image, the coverage percentage being a ratio of a color gamut reproducible by first color information converted by corresponding the first color characteristic information to a predetermined condition, relative to a predetermined standard color gamut.

A twenty-third aspect of the present invention is the method of generating color correspondence information according to the twenty-second aspect. The method includes calculating, by the object recognition section, degrees of similarity between the first objects and recognition information of each object registered in the object database, and generating thumbnail images one-to-one corresponding to each of a plurality of pieces of recognition information of which degrees of similarity satisfy a predetermined condition; sending, from the color correspondence information generating system to the user terminal device, data including the degrees of similarity and thumbnail images; presenting, from the user terminal device to a user, thumbnail images of images of candidate objects similar to the first objects, and information of degrees of similarity between the candidate objects and the first objects, received from the color correspondence information generating system; sending, from the user terminal device to the color correspondence information generating system, data including designated information indicating which of the thumbnail images has been selected; and selecting, by the object recognition section, an object in the recognition information corresponding to the designated information.

A twenty-fourth aspect of the present invention is the method of generating color correspondence information according to the twenty-second or twenty-third aspect, the method includes sending, from the color correspondence information generating system to the user terminal device, data including image region information which is information indicating the image region; and receiving, by the user terminal device, data including the image region information, and marking a range indicated by the image region in the first image and presenting the marked data to a user.

In an aspect, the present invention, which has been described above, provides a color correspondence information generating system, a program, and a method of generating color correspondence information that provide a screen display which is close to the appearance of the actual colors of an object visible under ambient light of a predetermined light source, without requiring the user to possess a designated chart, without depending on ambient light of the light source at the time of image capture or the characteristics of the imaging device, and without having a special measuring device for measuring the spectral energy distribution of the light source.

REFERENCE SIGNS LIST 1, 1A . . . Color correspondence information generating system
2-1, 2-2 . . . User terminal device
3-1, 3-2 . . . Imaging device
4-1, 4-2 . . . Display device
5 . . . Network
11, 11A . . . Image correction server
12 . . . Color-correction-object database
13 . . . Spectral sensitivity characteristic database
61, 71 . . . Captured-image acquisition section
62, 72 . . . Color-correction-object recognition section
63 . . . Color-correction-matrix calculation section
64, 75 . . . Reproduction-color-gamut determination section
65 . . . Standard RGB image generation section
66, 77 . . . Storage section
73 . . . Spectral energy distribution estimation section
74 . . . Spectral-image generation section
76 . . . Display-image generation section Obviously, numerous modifications and variations of the present invention are possible in light of the above teachings. It is therefore to be understood that within the scope of the appended claims, the invention may be practiced otherwise than as specifically described herein.

What is claimed is:

1. A color correspondence information generating system which generates color correspondence information indicating a correspondence relation between color information and color characteristic information using a first image obtained by capturing first objects under an environment of a light source, the color characteristic information indicating a characteristic of color represented by an image, the system comprising:
processing circuitry configured to:
store, in an object database, correspondences between recognition information for recognizing the respective first objects and the color characteristic information about the first objects recognized by the recognition information,
recognize the first objects in the first image from the first image and the recognition information,
output image regions of the first objects in the first image and first color characteristic information, the first color characteristic information being the color characteristic information corresponding to the first objects,
generate the color correspondence information, which is a correspondence relation between the color information and the color characteristic information, using the color information and the first color characteristic information of pixels in the image regions,
determine a measure of color gamut reproduction, the measure of color gamut reproduction being based on a color space corresponding to the first color characteristic information, and
evaluate the first image based on the measure of color gamut reproduction,
wherein the color characteristic information and the recognition information have a one-to-one correspondence relation with each other or the color characteristic information is the recognition information itself.

2. The color correspondence information generating system according to claim 1, wherein at least one of the first objects is an object different from a color chart.

3. The color correspondence information generating system according to claim 2, wherein the object different from the color chart is an object having a plurality of colors including a product available to a general user, and a package and a container of the product.

4. The color correspondence information generating system according to claim 1, wherein the processing circuitry is further configured to:
estimate second color characteristic information from the first image or a second image, and
estimate the color correspondence information,
wherein the second color characteristic information is color characteristic information of a second object different from the first objects,
wherein the first image is obtained by capturing the first objects and the second object in a same image, and
wherein the second image is an image of the second object captured under same light source as the first object captured in the first image.

5. The color correspondence information generating system according to claim 4, wherein the processing circuitry is further configured to:
generate a reproduction color sufficiency percentage as the measure of color gamut reproduction, the reproduction color sufficiency percentage being a ratio of pixel values of pixels in a region corresponding to the second object in the first image or the second image, included in a subspace of an RGB space constituted by pixel values of pixels in regions corresponding to the first objects in the first image.

6. The color correspondence information generating system according to claim 5, wherein the color correspondence information generating system is connected to a user terminal device of a user via a network, and sends and receives data to and from the user terminal device via the network,
wherein the data received from the user terminal device includes the first image, and
wherein the data sent to the user terminal device includes the reproduction color sufficiency percentage.

7. The color correspondence information generating system according to claim 1, wherein the processing circuitry is further configured to:
estimate color information of another object different from the first objects in an environment of the light source, using the color correspondence information and the color characteristic information of the another object.

8. The color correspondence information generating system according to claim 1, wherein the color characteristic information is reference color information, which is color information of one or more of the first objects captured in an environment of a standard light source, and
wherein the color correspondence information is a color-correction matrix for performing color conversion.

9. The color correspondence information generating system according to claim 8, wherein the color correspondence information generating system is connected to a user terminal device of a user via a network, and sends and receives data to and from the user terminal device via the network,
wherein the data received from the user terminal device includes the first image,
wherein the data sent to the user terminal device includes acceptability determination information indicating whether the first image is acceptable for use, and
wherein the processing circuitry is further configured to set information indicating unacceptability in the acceptability determination information when a reproduction color sufficiency percentage is lower than a predetermined threshold.

10. The color correspondence information generating system according to claim 1, wherein the processing circuitry is further configured to:
store, in a spectral sensitivity characteristic database, spectral sensitivity characteristics of an imaging device used for capturing the first image,
wherein the color characteristic information is spectral reflectance of one or more of the first objects, and
wherein the color correspondence information is a combination of spectral energy distribution of the light source and the spectral sensitivity characteristics.

11. The color correspondence information generating system according to claim 1, wherein the color correspondence information generating system is connected to a user terminal device of a user via a network, and sends and receives data to and from the user terminal device via the network,
the data received from the user terminal device includes the first image, and
the data sent to the user terminal device includes acceptability determination information indicating whether the first image is acceptable for use.

12. The color correspondence information generating system according to claim 11,
wherein the processing circuitry is further configured to
calculate degrees of similarity between the first objects and pieces of recognition information of each object registered in the object database, and
generate thumbnail images one-to-one corresponding to each of a plurality of pieces of recognition information of which the degrees of similarity satisfy a predetermined condition,
wherein the data sent to the user terminal device includes the degrees of similarity and thumbnail images,
wherein the data received from the user terminal device includes designated information indicating which of the thumbnail images has been selected, and
wherein the processing circuitry is further configured to select an object of the recognition information corresponding to the designated information.

13. The color correspondence information generating system according to claim 12, wherein the data sent to the user terminal device includes image region information, which is information indicating the image regions.

14. The color correspondence information generating system according to claim 11, wherein the processing circuitry is further configured to:
convert the first color characteristic information, after being made to correspond to a predetermined condition, to first color information, which is the color information,
generate a coverage percentage as the measure of color gamut reproduction,
determine whether the coverage percentage is lower than a predetermined threshold, the coverage percentage being a ratio of a color gamut reproducible by the first color information relative to a predetermined standard color gamut, and
add information indicating unacceptability to the acceptability determination information when the coverage percentage is lower than a predetermined threshold.

15. The color correspondence information generating system according to claim 11, wherein the processing circuitry is further configured to:
convert the first color characteristic information, after being made to correspond to a predetermined condition, to first color information, and
generate a coverage percentage as the measure of color gamut reproduction, which is a ratio of a color gamut reproducible by the first color information relative to a predetermined standard color gamut, and
wherein the data sent to the user terminal device includes the coverage percentage.

16. A non-transitory computer-readable medium including computer executable instructions, wherein the instructions, when executed by a computer, cause a computer to function as a user terminal device connected to a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, generate the color correspondence information, which is the correspondence relation between the color information and the color characteristic information, using the color information and the first color characteristic information of pixels in the image regions, determine a measure of color gamut reproduction, the measure of color gamut reproduction being based on a color space corresponding to the first color characteristic, and evaluate the first image based on the measure of color gamut reproduction, wherein the color characteristic information and the recognition information have a one-to-one correspondence relation with each other or the color characteristic information is the recognition information itself, wherein the color correspondence information generating system is connected to a user terminal device of a user via a network, and sends and receives data to and from the user terminal device via the network, the data received from the user terminal device includes the first image, and the data sent to the user terminal device includes acceptability determination information indicating whether the first image is acceptable for use, and to implement a method comprising:

sending the first image to the color correspondence information generating system; and receiving the acceptability determination information from the color correspondence information generating system.

17. The non-transitory computer-readable medium according to claim 16, wherein the method further comprises:

prompting a user to image another object different from the first objects in the first image when the acceptability determination information indicates unacceptability.

18. A non-transitory computer-readable medium including computer executable instructions, wherein the instructions, when executed by a computer, cause a computer to function as a user terminal device connected to a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, and generate the color correspondence information, which is the correspondence relation between the color information and the color characteristic information, using the color information and the first color characteristic information of pixels in the image regions, wherein the color characteristic information and the recognition information have a one-to-one correspondence relation with each other or the color characteristic information is the recognition information itself, wherein the color correspondence information generating system is connected to a user terminal device of a user via a network, and sends and receives data to and from the user terminal device via the network, the data received from the user terminal device includes the first image, and the data sent to the user terminal device includes acceptability determination information indicating whether the first image is acceptable for use, wherein the processing circuitry is further configured to calculate degrees of similarity between the first objects and pieces of recognition information of each object registered in the object database, and generate thumbnail images one-to-one corresponding to each of a plurality of pieces of recognition information of which the degrees of similarity satisfy a predetermined condition, wherein the data sent to the user terminal device includes the degrees of similarity and thumbnail images, wherein the data received from the user terminal device includes designated information indicating which of the thumbnail images has been selected, and wherein the processing circuitry is further configured to select an object of the recognition information corresponding to the designated information, and to implement a method comprising:

receiving, from the color correspondence information generating system, thumbnail images of images of candidate objects similar to the first objects, and information on degrees of similarity between the candidate objects and the first objects;

presenting, to a user, the thumbnail images and degrees of similarity of the candidate objects corresponding to the thumbnail images; and sending designated information indicating which of the candidate objects has been selected to the color correspondence information generating system.

19. A non-transitory computer-readable medium including computer executable instructions, wherein the instructions, when executed by a computer, cause a computer to function as a user terminal device connected to a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, and generate the color correspondence information, which is the correspondence relation between the color information and the color characteristic information, using the color information and the first color characteristic information of pixels in the image regions, wherein the color characteristic information and the recognition information have a one-to-one correspondence relation with each other or the color characteristic information is the recognition information itself, wherein the color correspondence information generating system is connected to a user terminal device of a user via a network, and sends and receives data to and from the user terminal device via the network, the data received from the user terminal device includes the first image, and the data sent to the user terminal device includes acceptability determination information indicating whether the first image is acceptable for use, wherein the processing circuitry is further configured to calculate degrees of similarity between the first objects and pieces of recognition information of each object registered in the object database, and generate thumbnail images one-to-one corresponding to each of a plurality of pieces of recognition information of which the degrees of similarity satisfy a predetermined condition, wherein the data sent to the user terminal device includes the degrees of similarity and thumbnail images, wherein the data received from the user terminal device includes designated information indicating which of the thumbnail images has been selected, and wherein the processing circuitry is further configured to select an object of the recognition information corresponding to the designated information, wherein the data sent to the user terminal device includes image region information, which is information indicating the image regions, and to implement a method comprising:

receiving the image regions of the first objects from the color correspondence information generating system; and marking a range indicated by the image regions in the first image and presenting the marked image region to a user.

20. A non-transitory computer-readable medium including computer executable instructions, wherein the instructions, when executed by a computer, cause a computer to function as a user terminal device connected to a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, and generate the color correspondence information, which is the correspondence relation between the color information and the color characteristic information, using the color information and the first color characteristic information of pixels in the image regions, wherein the color characteristic information and the recognition information have a one-to-one correspondence relation with each other or the color characteristic information is the recognition information itself, wherein the processing circuitry is further configured to: estimate second color characteristic information from the first image or a second image, and estimate the color correspondence information, wherein the second color characteristic information is color characteristic information of a second object different from the first objects, wherein the first image is obtained by capturing the first objects and the second object in a same image, and wherein the second image is an image of the second object captured under same light source as the first object captured in the first image, wherein the processing circuitry is further configured to: generate a reproduction color sufficiency percentage being a ratio of pixel values of pixels in a region corresponding to the second object in the first image or the second image, included in a subspace of an RGB space constituted by pixel values of pixels in regions corresponding to the first objects in the first image, wherein the color correspondence information generating system is connected to a user terminal device of a user via a network, and sends and receives data to and from the user terminal device via the network, wherein the data received from the user terminal device includes the first image, and wherein the data sent to the user terminal device includes the reproduction color sufficiency percentage, and to implement a method comprising:

receiving the reproduction color sufficiency percentage from the color correspondence information generating system; and presenting the reproduction color sufficiency percentage to a user.

21. A non-transitory computer-readable medium including computer executable instructions, wherein the instructions, when executed by a computer, cause the computer to function as a user terminal device connected to a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, and generate the color correspondence information, which is the correspondence relation between the color information and the color characteristic information, using the color information and the first color characteristic information of pixels in the image regions, wherein the color characteristic information and the recognition information have a one-to-one correspondence relation with each other or the color characteristic information is the recognition information itself, wherein the color correspondence information generating system is connected to a user terminal device of a user via a network, and sends and receives data to and from the user terminal device via the network, the data received from the user terminal device includes the first image, and the data sent to the user terminal device includes acceptability determination information indicating whether the first image is acceptable for use, wherein the processing circuitry is further configured to: convert the first color characteristic information, after being made to correspond to a predetermined condition, to first color information, and generate a coverage percentage, which is a ratio of a color gamut reproducible by the first color information relative to a predetermined standard color gamut, and wherein the data sent to the user terminal device includes the coverage percentage, and to implement a method comprising:

receiving the coverage percentage from the color correspondence information generating system; and presenting the coverage percentage to a user.

22. A method of generating color correspondence information using a color correspondence information generating system which generates color correspondence information indicating a correspondence relation between color information and color characteristic information using a first image obtained by capturing first objects under an environment of a light source, the color characteristic information indicating a characteristic of color represented by an image, the system including processing circuitry configured to: store, in an object database, correspondences between recognition information for recognizing the respective first objects and the color characteristic information about the first objects recognized by the recognition information, recognize the first objects in the first image from the first image and the recognition information, output image regions of the first objects in the first image and first color characteristic information, the first color characteristic information being the color characteristic information corresponding to the first objects, and generate the color correspondence information, which is the correspondence relation between the color information and the color characteristic information, using the color information and the first color characteristic information of pixels in the image regions, wherein the color characteristic information and the recognition information have a one-to-one correspondence relation with each other or the color characteristic information is the recognition information itself, wherein the color correspondence information generating system is connected to a user terminal device of a user via a network, and sends and receives data to and from the user terminal device via the network, the data received from the user terminal device includes the first image, and the data sent to the user terminal device includes acceptability determination information indicating whether the first image is acceptable for use and a user terminal device owned by a user, the method comprising:

sending and receiving data to and from the user terminal device via a network, the color correspondence information generating system being connected to the user terminal device via the network, wherein the data received by the color correspondence information generating system from the user terminal device includes the first image, and wherein data sent from the color correspondence information generating system to the user terminal device includes one of acceptability determination information, a reproduction color sufficiency percentage, and coverage percentage, the acceptability determination information indicating whether the first image is acceptable for use, the reproduction color sufficiency percentage being a ratio of pixel values of pixels in a region corresponding to a second object in the first image or a second image, included in a subspace of an RGB space constituted by pixel values of pixels in regions corresponding to the first objects in the first image, the coverage percentage being a ratio of a color gamut reproducible by first color information converted by corresponding the first color characteristic information to a predetermined condition, relative to a predetermined standard color gamut.

23. The method of generating color correspondence information according to claim 22, the method further comprising:

calculating, by an object recognition section, degrees of similarity between the first objects and recognition information of each object registered in the object database, and generating thumbnail images one-to-one corresponding to each of a plurality of pieces of recognition information of which the degrees of similarity satisfy a predetermined condition;

sending, from the color correspondence information generating system to the user terminal device, data including the degrees of similarity and thumbnail images;

presenting, from the user terminal device to a user, thumbnail images of images of candidate objects similar to the first objects, and information of degrees of similarity between the candidate objects and the first objects, received from the color correspondence information generating system;

sending, from the user terminal device to the color correspondence information generating system, data including designated information indicating which of the thumbnail images has been selected; and selecting, by the object recognition section, an object in the recognition information corresponding to the designated information.

24. The method of generating color correspondence information according to claim 22, the method further comprising:

sending, from the color correspondence information generating system to the user terminal device, data including image region information which is information indicating the image regions; and receiving, by the user terminal device, data including the image region information, and marking a range indicated by the image regions in the first image and presenting the marked data to a user.

\* \* \* \* \*